United States Patent
Gao et al.

(10) Patent No.: US 10,419,094 B2
(45) Date of Patent: Sep. 17, 2019

(54) CHANNEL STATE INFORMATION MEASUREMENT METHOD, CHANNEL STATE INFORMATION ACQUISITION METHOD, TERMINAL AND NETWORK DEVICE

(71) Applicant: CHINA ACADEMY OF TELECOMMUNICATIONS TECHNOLOGY, Beijing (CN)

(72) Inventors: Qiubin Gao, Beijing (CN); Runhua Chen, Beijing (CN); Hui Li, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 56 days.

(21) Appl. No.: 15/527,311

(22) PCT Filed: Sep. 28, 2015

(86) PCT No.: PCT/CN2015/090928
§ 371 (c)(1),
(2) Date: May 16, 2017

(87) PCT Pub. No.: WO2016/078478
PCT Pub. Date: May 26, 2016

(65) Prior Publication Data
US 2017/0338878 A1    Nov. 23, 2017

(30) Foreign Application Priority Data

Nov. 17, 2014 (CN) .......................... 2014 1 0654785

(51) Int. Cl.
*H04B 7/06* (2006.01)
*H04L 1/06* (2006.01)
(Continued)

(52) U.S. Cl.
CPC .......... *H04B 7/0626* (2013.01); *H04B 7/024* (2013.01); *H04B 7/0456* (2013.01);
(Continued)

(58) Field of Classification Search
CPC .... H04B 7/2121; H04B 7/2123; H04B 1/525; H04B 1/1027; H04J 2203/0069;
(Continued)

(56) References Cited

U.S. PATENT DOCUMENTS 6,414,955 B1 * 7/2002 Clare ...................... H04L 41/12
370/390
7,085,248 B1 * 8/2006 Holma ................. H04B 17/336
370/329

(Continued)

FOREIGN PATENT DOCUMENTS

| CN | 103220088 A | 7/2013 |
|---|---|---|
| WO | 2013085331 A1 | 6/2013 |
| WO | 2013169196 A1 | 11/2013 |

OTHER PUBLICATIONS

International Search Report for PCT/CN2015/090928 dated Dec. 31, 2015 and its English translation provided by WIPO.

(Continued)

*Primary Examiner* — Sharad Rampuria
(74) *Attorney, Agent, or Firm* — Ladas & Parry, LLP

(57) ABSTRACT

A CSI measurement method, a CSI acquisition method, a terminal and a network device are provided, to measure CSI. The terminal performs interference measurement to acquire initial interference measurement result, determine the CSI based on the initial interference measurement result and an interference measurement parameter configured by the network device, and then report the determined CSI to the network device. The interference measurement parameter is configured by the network device, so the interference mea- (Continued)

surement parameter configured by the network device is capable of reflecting an actual situation of interference information, and interference information acquired by the terminal based on the interference measurement parameter matches interference information for actual transmission in a better manner. As a result, it is able to improve a matching degree between the interference information acquired by the terminal and the interference information for the actual transmission, thereby to enable a network to select a more appropriate parameter for link adaptation.

17 Claims, 3 Drawing Sheets

(51) Int. Cl.
  | | |
  |---|---|
  | *H04L 5/00* | (2006.01) |
  | *H04W 24/10* | (2009.01) |
  | *H04W 72/08* | (2009.01) |
  | *H04B 7/024* | (2017.01) |
  | *H04L 1/00* | (2006.01) |
  | *H04B 17/318* | (2015.01) |
  | *H04L 25/02* | (2006.01) |
  | *H04B 7/0456* | (2017.01) |
  | *H04B 17/345* | (2015.01) |

(52) U.S. Cl.
  CPC ......... *H04B 7/0639* (2013.01); *H04B 17/318* (2015.01); *H04L 1/0026* (2013.01); *H04L 1/06* (2013.01); *H04L 5/006* (2013.01); *H04L 5/0048* (2013.01); *H04L 5/0051* (2013.01); *H04L 5/0057* (2013.01); *H04L 25/021* (2013.01); *H04W 24/10* (2013.01); *H04W 72/082* (2013.01); *H04B 7/0621* (2013.01); *H04B 17/345* (2015.01); *H04L 5/0035* (2013.01); *H04L 5/0058* (2013.01); *H04L 5/0073* (2013.01)

(58) Field of Classification Search
  CPC .... H04Q 13/394; H04W 72/04; H04W 72/12; H04W 76/00; H04W 16/10; H04W 16/14; H04W 28/16; H04W 76/02; H04W 16/12; H04W 28/04; H04W 74/02; H04W 84/042; H04W 24/00; H04W 72/082; H04W 28/18; H04W 28/24; H04W 72/085
  See application file for complete search history.

(56) References Cited

U.S. PATENT DOCUMENTS

| | | | |
|---|---|---|---|
| 9,172,438 B2* | 10/2015 | Koivisto | H04B 7/024 |
| 9,942,785 B2* | 4/2018 | Gao | H04L 5/0057 |
| 2013/0303090 A1* | 11/2013 | Hammarwall | H04B 7/0456 |
| | | | 455/67.13 |
| 2014/0003266 A1 | 1/2014 | Gomadam | |
| 2014/0044061 A1 | 2/2014 | Yue et al. | |
| 2014/0355469 A1 | 12/2014 | Kang et al. | |
| 2015/0036610 A1* | 2/2015 | Kim | H04B 7/0639 |
| | | | 370/329 |

OTHER PUBLICATIONS

Written Opinion of the International Search Authority for PCT/CN2015/090928 dated Dec. 31, 2015 and its English translation provided by WIPO.

International Preliminary Report on Patentability (IPRP; Ch 1) for PCT/CN2015/090928 dated Jun. 1, 2017 and its English translation provided by WIPO.

From EPO Application No. 15861268.9, Supplementary European Search Report and Search Opinion dated Nov. 7, 2017.

Ericsson et al., "CQI Definition of UE Emulated Intra CoMP Cluster Interference"; 3GPP TSG-RAN WG1 #69; R1-122837; May 21, 2012-May 30, 2012; May 21-30.

* cited by examiner

CHANNEL STATE INFORMATION MEASUREMENT METHOD, CHANNEL STATE INFORMATION ACQUISITION METHOD, TERMINAL AND NETWORK DEVICE

CROSS-REFERENCE TO RELATED APPLICATIONS

The present disclosure is the U.S. national phase of PCT Application PCT/CN2015/090928 filed on Sep. 28, 2015, which claims a priority to the Chinese patent application No. 201410654785.4 filed on Nov. 17, 2014, the disclosures of which are incorporated herein by reference in their entireties.

TECHNICAL FIELD

The present disclosure relates to the field of communication, in particular to a Channel Station Information (CSI) measurement method, a CSI acquisition method, a terminal and a network device.

BACKGROUND

For a Long Term Evolution (LTE) system, information that reflects a downlink physical channel state, i.e., CSI, mainly includes a Pre-coding Matrix Indicator (PMI), a Rank Indicator (RI) and a Channel Quality Indicator (CQI).

A pre-coding matrix determined by the PMI may be considered as a quantized value of the CSI. A closed-loop pre-coding technique has been introduced into an LTE Release 8 system, so as to improve spectrum efficiency. As required by the closed-loop pre-coding technique, an identical set of pre-coding matrices, i.e., a codebook, needs to be stored in a base station and a terminal. Upon the estimation of the channel information based on a cell common pilot frequency, the terminal may select one pre-coding matrix from the codebook based on a certain criterion. This criterion may include maximum mutual information, maximum output Signal-to-Interference and Noise Ratio (SINR), and etc. the PMI of the selected pre-coding matrix may be fed back by the terminal to the base station through an uplink channel. Then, the base station may determine the pre-cording matrix that should be used by the terminal based on the received PMI.

The RI corresponds to the maximum number of spatial data stream capable of being supported by a spatial channel from the base station to the terminal. In LTE and LTE-Advanced (LTE-A) standards, a data block transmitted from the base station to the terminal is called as a codeword. In the case of spatial multiplexing, the base station may transmit two codewords at most to the terminal simultaneously, or merely transmit one codeword to the terminal. Data in the codeword may be mapped onto one or more spatial data streams based on a certain rule. In the case that two codewords are transmitted simultaneously, the total number of the data streams onto which the two codewords are mapped shall not exceed the maximum number of the data streams capable of being supported by the spatial channel from the base station to the terminal, and this maximum number of the data streams maybe acquired based on the RI reported by the terminal.

The CQI is provided so that the terminal may select an appropriate modulating and encoding level for a transmission block based on the channel quality and recommend it to the base station, so as to enable the base station to modulate and encode the transmission block based on this information, thereby to utilize a transmission capability of the channel to the greatest extent. Also, the CQI may also be understood as quantization of the channel quality information. In the case of high quality, the base station may support a higher-level modulating and encoding mode, so as to acquire a greater transmission speed. In the case of low quality, the base station may transmit the data in a lower-level modulating and encoding mode, so as to ensure the transmission robustness.

The calculation and selection of the RI, PMI and CQI in the CSI depends on the accuracy of interference information measurement performed by the terminal.

In the related art, the measurement and calculation on interference information is merely performed based on a common Reference Signal (CRS) or a Channel State information Reference Signal (CSI-RS) in the LTE system. Because the interference information is measured and calculated on such a single condition, a relatively big error may occur for an interference measurement result.

In a word, there is an urgent need to provide a CSI measurement method, a CSI acquisition method, a terminal and a network device, so as to measure the CSI and improve the accuracy of the interference measurement.

SUMMARY

(1) Technical Problem to be Solved

An object of the present disclosure is to provide a CSI measurement method, a CSI acquisition method, a terminal and a network device, so as to measure CSI and improve the accuracy of the interference measurement.

(2) Technical Solution

In one aspect, the present disclosure provides a CSI measurement method, including steps of: measuring interference by a terminal, to acquire initial interference; determining CSI by the terminal, based on the initial interference and interference measurement parameters configured by a network device; and reporting, by the terminal, the CSI to the network device.

In another aspect, the present disclosure provides a CSI acquisition method, including steps of: transmitting, by a network device, configuration information to a terminal, the configuration information including an interference measurement parameter; and receiving, by the network device, CSI reported by the terminal, the CSI being determined by the terminal based on initial interference measured by the terminal and the interference measurement parameter configured by the network device.

In yet another aspect, the present disclosure provides a terminal, including: a measurement module configured to measure interference to acquire initial interference; a determination module configured to determine CSI based on the initial interference and interference measurement parameters configured by a network device; and a reporting module configured to report the CSI to the network device.

In still yet another aspect, the present disclosure provides a network device, including: a transmission module configured to transmit configuration information to the terminal, the configuration information including an interference measurement parameter; and a reception module configured to receive Channel State Information (CSI) reported by the terminal, the CSI being determined by the terminal based on initial interference measured by the terminal and the interference measurement parameters configured by the network device.

In still yet another aspect, the present disclosure provides a terminal, including: a processor; a memory connected to the processor via a bus interface and configured to store therein programs and data for the operation of the processor; and a transceiver configured to communicate with any other device over a transmission medium. The processor is configured to call and execute the programs and data stored in the memory so as to enable the terminal to: measure interference to acquire initial interference; determine Channel State Information (CSI) based on the initial interference and interference measurement parameters configured by a network device; and report the CSI to the network device.

In still yet another aspect, the present disclosure provides a network device, including: a processor; a memory connected to the processor via a bus interface and configured to store therein programs and data for the operation of the processor; and a transceiver configured to communicate with any other device over a transmission medium. The processor is configured to call and execute the programs and data stored in the memory, so as to enable the network device to: transmit configuration information to a terminal, the configuration information comprising interference measurement parameters; and receive Channel State Information (CSI) reported by the terminal, the CSI being determined by the terminal based on initial interference measured by the terminal and the interference measurement parameters configured by the network device.

(3) Beneficial Effect

According to the embodiments of the present disclosure, the terminal may perform the interference measurement so as to acquire the initial interference measurement result, determine the CSI based on the initial interference measurement result and the interference measurement parameter configured by the network device, and report the determined CSI to the network device. The CSI may be determined by the terminal based on the initial interference measurement result and the interference measurement parameter configured by the network device, so it is able to determine the CSI on the basis of more criterions, thereby to improve the accuracy of the determined CSI and enable a network to select a more appropriate parameter to perform link adaptation based on the more accurate CSI.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

Figure 1:
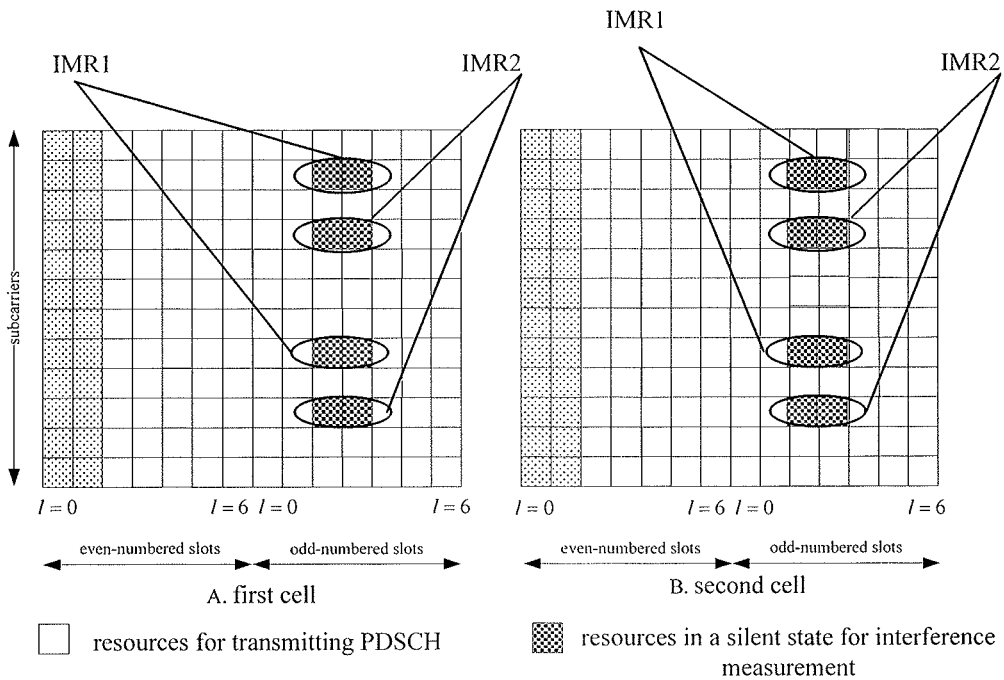
FIG. 1 is a schematic view showing Interference Measurement Resources (IMRs) configured by a network device for cells.

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

An object of the present disclosure is to provide a CSI measurement method, a CSI acquisition method, a terminal and a network device, so as to measure CSI and improve a matching degree between interference information acquired through the measurement and interference information for the actual transmission, thereby to enable a network to select a more appropriate parameter in the case of performing link adaptation.

The schemes in the embodiments of the present disclosure may be applied to an LTE system or an LTE-A system.

In LTE Release 8 to LTE Release 10 systems, interference measurement may be performed by a terminal on a CRS or CSI-RS, and as a main idea, the interference on the CRS or CSI-RS may be measured.

In an LTE Release 11 system, the interference measurement may be performed by the terminal on IMRs. The accuracy of CSI determined by the terminal depends on the accuracy of the interference measurement performed by the terminal, so the IMRs dedicated for the terminal has been introduced into the LTE Release 11 system, so as to enable the terminal to measure an interference level corresponding to a transmission hypothesis. The network device may configure the IMRs dedicated for the terminal. Each IMR may occupy a group of Resource Elements (REs), and the network device may control the transmission of signals on the group of REs, so that the terminal may perform the interference measurement on the group of REs.

FIG. 1 shows an example for the configuration of two groups of IMRs. In FIG. 1, a left part (part A) shows the IMRs configured by the network device for a first cell on corresponding resources, and a right part (part B) shows the IMRs configured by the network device for a second cell on corresponding resources. Presumed that no signal is transmitted on IMR1 for either of the first cell and the second cell, a signal received by the terminal on the IMR1 may just be interference from a cell other than the first cell and the second cell. Similarly, the terminal may estimate the interference from the cell other than the first cell and the second cell on IMR2.

In the embodiments of the present disclosure, the terminal may be a mobile phone, a person computer (PC) or a flat-panel computer.

In order to make the objects, the technical solutions and the advantages of the present disclosure more apparent, the present disclosure will be described hereinafter in a clear and complete manner in conjunction with the drawings and embodiments. It should be appreciated that, the following embodiments are illustrative purposes only, but shall not be used to limit the scope of the present disclosure.

Figure 2:
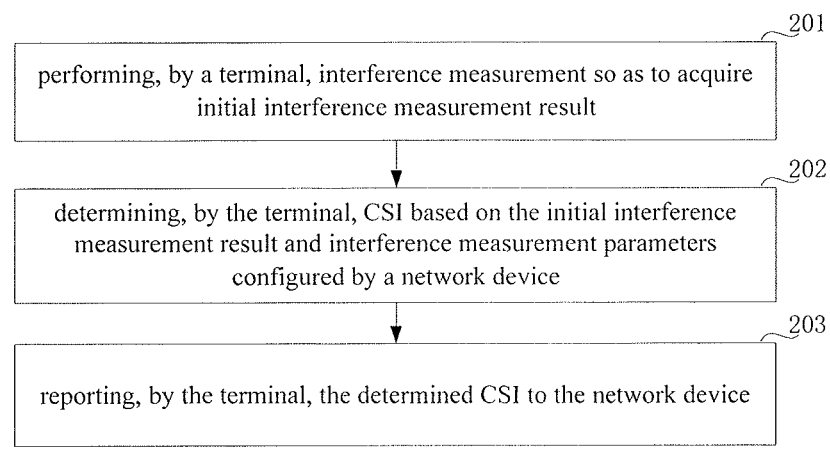
FIG. 2 is a flow chart of a CSI measurement method in some embodiments of the present disclosure.

FIG. 2 is a flow chart showing a CSI measurement method. As shown in FIG. 2, the CSI measurement method includes: Step 201 of performing, by a terminal, interference measurement so as to acquire initial interference measurement result; Step 202 of determining, by the terminal, CSI based on the initial interference measurement result and an interference measurement parameter configured by a network device; and Step 203 of reporting, by the terminal, the determined CSI to the network device.

According to the embodiments of the present disclosure, the terminal may determine the CSI based on the initial interference measurement result and the interference measurement parameter configured by the network device, so it is able to determine the CSI on the basis of more criterions, thereby to improve the accuracy of the determined CSI and enable a network to select a more appropriate parameter to perform link adaptation based on the more accurate CSI.

In addition, prior to Step 202 and prior to or subsequent to Step 201, the terminal needs to receive configuration information from the network device and perform corresponding configuration in the following two modes.

Mode 1

The network device may configure the interference measurement parameters of an interference source base station for the terminal. Optionally, the interference measurement parameters may be grouped into one or more groups, and each group of interference measurement parameters may correspond to one interference source base station. Each group of interference measurement parameters may include one or more interference measurement CSI-RSs, and each interference measurement CSI-RS may correspond to one or more interference signal characteristic parameters. Here, the interference measurement CSI-RS refers to a CSI-RS from one interference source base station.

Mode 2

The network device may configure one or more interference measurement CSI-RSs, one or more interference signal characteristic parameters and a correspondence between each interference measurement CSI-RS and one or more interference signal characteristic parameters for the terminal. Optionally, the network device may also configure a correspondence between each interference measurement CSI-RS and an interference source base station. In this mode, each interference source base station may correspond to one or more interference measurement CSI-RSs, and each interference measurement CSI-RS may correspond to one or more interference signal characteristic parameters. Here, the interference measurement CSI-RS refers to a CSI-RS from one interference source base station.

Based on the above Mode 1 or 2, in Step 202, the terminal may determine the CSI based on the initial interference measurement result, the interference measurement CSI-RS configured by the network device, and the interference signal characteristic parameter corresponding to the interference measurement CSI-RS configured by the network device.

The interference measurement parameter in Mode 1 and the interference measurement CSI-RS and the interference signal characteristic parameter in Mode 2 are both configured by the network device, so this information configured by the network device may reflect an actual interference situation in a better manner as compared with that in the related art.

For example, the interference measurement CSI-RS configured by the network device for the terminal is provided with respect to the interference source base station of the terminal, and the interference information may be acquired by combining the initial interference measurement result in Step 201 and a measurement result acquired on the basis of the interference measurement CSI-RS in Step 202. In this way, the acquired interference information may be used to reflect an actual interference situation in a better manner as compared with that in the related art.

Further, the interference signal characteristic parameter configured by the network device for the terminal may include a correlation matrix for a signal from an interference source base station, e.g., a set of pre-coding matrices used by the interference source base station for data transmission, so this interference signal characteristic parameter may be used to reflect a data transmission situation of the interference source base station to some extent. In this way, the interference information acquired based on the initial interference measurement result, the interference measurement result acquired on the basis of the interference measurement CSI-RS and the correlation matrix for the signal from the interference source base station may match the interference information for the actual transmission in a better manner as compared with that in the related art.

In Mode 2, the one or more interference measurement CSI-RSs corresponding to each interference source base station and the one or more interference signal characteristic parameter corresponding to each CSI-RS may be considered as a group of interference measurement parameters in Mode 1. The following description will be given by taking Mode 1 as an example, and a person skilled in the art may, based on this correspondence, replace terms in the group of interference measurement parameters with the one or more interference measurement CSI-RSs corresponding to each interference source base station and the one or more interference signal characteristic parameters corresponding to each CSI-RS in Mode 2.

In the embodiments of the present disclosure, in the case that a plurality of groups of interference measurement parameters has been configured, the terminal may perform the interference measurement and calculation based on all the interference measurement parameters, or the interference measurement parameters, the interference measurement CSI-RSs and the interference signal characteristic parameters to be used by the terminal may be indicated through high-layer signaling or Downlink Control Information (DCI).

Optionally, one or more of the followings may be indicated in the DCI: one or more groups of interference measurement parameters to be used by the terminal, one or more interference measurement CSI-RSs in each group of the interference measurement parameters to be used by the terminal, and one or more interference signal characteristic parameters corresponding to each interference measurement CSI-RS to be used by the terminal. In other words, the DCI may be used to indicate the terminal to use which one or more groups of interference measurement parameters to perform the interference measurement and calculation, or which one or more groups of interference measurement parameters may be activated. In the case that each group of interference measurement parameters includes one or more interference measurement CSI-RSs, a specific one or ones of the interference measurement CSI-RSs in the set of interference measurement parameters may be activated through the DCI. In the case that each interference measurement CSI-RS corresponds to one or more interference signal characteristic parameters, a specific one or ones of the interference signal characteristic parameters corresponding to a specific interference measurement CSI-RS in the set of interference measurement parameters may be activated through the DCI. In another possible embodiment of the present disclosure, the DCI may also be used to indicate the terminal not to use any interference measurement parameter, i.e., no interference measurement parameter may be activated. In this case, the terminal may use the interference signal acquired by measuring the IMRs to measure and calculate the CSI. In addition, in the case that no IMR is configured by the network device, the terminal may use the acquired interference signal to measure and calculate the CSI.

Each interference source base station may be a macro base station, or a low-power node such as a Remote Radio Head (RRH), or a relay node. In addition, the interference source base station may also refer to a plurality of macro base stations, a plurality of low-power nodes or a plurality of relay nodes, or a combination of a plurality of macro base stations and a plurality of low-power nodes.

The CSI-RS is taken an example of the interference measurement CSI-RS. Of course, the other measurement pilot signal such as a CRS or a De-Modulation Reference Signal (DMRS) may also be used, and at this time, the method is the same.

To be specific, DCI bits may be used to indicate the interference measurement parameters, the interference measurement CSI-RSs and the interference signal characteristic parameters to be used by the terminal. A correspondence between values of the DCI bits and the interference measurement parameters to be used may be pre-agreed, or configured by the network device for the terminal through signaling.

How to use the DCI bits to indicate the interference measurement parameters, the interference measurement CSI-RSs and the interference signal characteristic parameters to be used by the terminal will be described hereinafter in more details through some examples.

Several scenarios where the DCI bits are used to indicate the interference measurement parameters to be used by the terminal will be described hereinafter.

Scenario 1

Presumed that four groups of interference measurement parameters have been configured for the terminal, two DCI bits may be used to indicate the terminal to use which group of interference measurement parameters to perform the CSI calculation. As shown in Table 1, the DCI bits 00 represent that a first group of interference measurement parameters is to be activated, the DCI bits 01 represent that a second group of interference measurement parameters is to be activated, the DCI bits 10 represent that a third group of interference measurement parameters is to be activated, and the DCI bits 11 represent that a fourth group of interference measurement parameters is to be activated.

TABLE 1

DCI analysis in Scenario 1

| DCI bits | Interference measurement parameters |
| --- | --- |
| 00 | Activating a first group of interference measurement parameters |
| 01 | Activating a second group of interference measurement parameters |
| 10 | Activating a third group of interference measurement parameters |
| 11 | Activating a fourth group of interference measurement parameters |

Scenario 2

Presumed that three groups of interference measurement parameters have been configured for the terminal, two DCI bits may be used to indicate the terminal to use which group of interference measurement parameters to perform the CSI calculation. As shown in FIG. 2, the DCI bits 00 represent that a first group of interference measurement parameters is to be activated, the DCI bits 01 represent that a second group of interference measurement parameters is to be activated, the DCI bits 10 represent that a third group of interference measurement parameters is to be activated, and the DCI bits 11 represent that no interference measurement parameters is to be activated.

TABLE 2

DCI analysis in Scenario 2

| DCI bits | Interference measurement parameters |
| --- | --- |
| 00 | Activating a first group of interference measurement parameters |
| 01 | Activating a second group of interference measurement parameters |
| 10 | Activating a third group of interference measurement parameters |
| 11 | Not activating any group of interference measurement parameters |

Scenario 3

The groups of interference measurement parameters may be further grouped, and two DCI bits may be used to indicate a plurality of groups of interference measurement parameters, or a plurality of groups of interference measurement parameters to be activated, as shown in Table 3. Eight groups of interference measurement parameters may be configured for the terminal. In Table 3, the DCI bits 00 represent that a first group of interference measurement parameters and a second group of interference measurement parameters are to be activated, the DCI bits 01 represent that a third group of interference measurement parameters and a fourth group of interference measurement parameters are to be activated, the DCI bits 10 represent that a fifth group of interference measurement parameters and a sixth group of interference measurement parameters are to be activated, and the DCI bits 11 represent that a seventh group of interference measurement parameters and an eighth group of interference measurement parameters are to be activated.

TABLE 3

DCI analysis in Scenario 3

| DCI bits | Interference measurement parameters |
| --- | --- |
| 00 | Activating a first group and a second group of interference measurement parameters |
| 01 | Activating a third group and a fourth group of interference measurement parameters |
| 10 | Activating a fifth group and a sixth group of interference measurement parameters |
| 11 | Activating a seventh group and an eighth group of interference measurement parameters |

Scenario 4

The groups of interference measurement parameters may be further grouped, and two DCI bits may be used to indicate a plurality of groups of interference measurement parameters, or a plurality of groups of interference measurement parameters to be activated, as shown in Table 4. Six groups of interference measurement parameters may be configured for the terminal. In Table 4, the DCI bits 00 represent that a first group of interference measurement parameters and a second group of interference measurement parameters are to be activated, the DCI bits 01 represent that a third group of interference measurement parameters and a fourth group of interference measurement parameters are to be activated, the DCI bits 10 represent that a fifth group of interference measurement parameters and a sixth group of interference measurement parameters are to be activated, and the DCI bits 11 represent that no interference measurement parameters is to be activated.

TABLE 4

DCI analysis in Scenario 4

| DCI bits | Interference measurement parameters |
| --- | --- |
| 00 | Activating a first group and a second group of interference measurement parameters |
| 01 | Activating a third group and a fourth group of interference measurement parameters |
| 10 | Activating a fifth group and a sixth group of interference measurement parameters |
| 11 | Not activating any group of interference measurement parameters |

Apart from the DCI bits, a DCI bitmap may also be used to indicate the interference measurement parameters to be used by the terminal to perform the interference measurement and calculation. In the bitmap, each bit corresponds to one group of interference measurement parameters. In the case that a DCI bit is 1, the terminal needs to use the group of interference measurement parameters to perform the interference measurement and calculation, and otherwise, the group of interference measurement parameters may not be used.

A mode of indicating the interference measurement CSI-RSs to be used by the terminal through the DCI bits will be described hereinafter.

In the case that a plurality of interference measurement CSI-RSs has been configured in one group of interference measurement parameters, the DCI may be used to indicate the terminal to use which one or ones of the interference measurement CSI-RSs to perform the interference measurement and calculation. Presumed that two DCI bits are used to indicate the terminal to use the first group of interference measurement parameters and the first group of interference measurement parameters including three interference measurement CSI-RSs, similar to the method mentioned above, the two DCI bits may be used to indicate the interference measurement CSI-RS to be used by the terminal. For example, four DCI bits may be used to indicate the terminal to use a first interference measurement CSI-RS in the first group of interference measurement parameters in Scenario 1. This mode is similar to the above mode of indicating the interference measurement parameters to be used by the terminal through the DCI bits, and thus will not be particularly defined herein.

Apart from the DCI bits, a DCI bitmap may also be used to indicate the interference measurement CSI-RSs to be used by the terminal to perform the interference measurement and calculation. In the bitmap, each bit corresponds to one interference measurement CSI-RS. In the case that a DCI bit is 1, the terminal needs to use the interference measurement CSI-RS to perform the interference measurement and calculation, and otherwise, the interference measurement CSI-RS may not be used.

A mode of indicating the interference signal characteristic parameters to be used by the terminal through the DCI bits will be described hereinafter.

In the case that a plurality of interference signal characteristic parameters has been configured for each interference measurement CSI-RS in a group of interference measurement parameters, the DCI may be used to indicate which one or ones of the interference signal characteristic parameters to be used by the terminal.

Some examples are given as follows. Four groups of interference measurement parameters have been configured by the network device for the terminal and a first group of interference measurement parameters includes three interference measurement CSI-RSs. At this time, the network device has indicated, through two DCI bits, the terminal to use a first interference measurement CSI-RS in the first group of interference measurement parameters. Presumed that the network device has configured a plurality of interference signal characteristic parameters for the interference measurement CSI-RS in the first group of interference measurement parameters, two another DCI bits may be used to indicate a specific one or ones of the interference signal characteristic parameters to be used by the terminal.

Scenario 5

Presumed that four interference signal characteristic parameters have been configured for the terminal, two DCI bits may be used to indicate which one of the interference signal characteristic parameters is to be used by the terminal to perform the interference calculation. As shown in Table 5, the DCI bits 00 represent that a first interference signal characteristic parameter is to be activated, the DCI bits 01 represent that a second interference signal characteristic parameter is to be activated, the DCI bits 10 represent that a third interference signal characteristic parameter is to be activated, and the DCI bits 11 represent that a fourth interference signal characteristic parameter is to be activated.

TABLE 5

DCI analysis in Scenario 5

| DCI bits | Interference signal characteristic parameter |
|---|---|
| 00 | Activating a first interference signal characteristic parameter |
| 01 | Activating a second interference signal characteristic parameter |
| 10 | Activating a third interference signal characteristic parameter |
| 11 | Activating a fourth interference signal characteristic parameter |

Scenario 6

Presumed that three interference signal characteristic parameters have been configured for the terminal, two DCI bits may be used to indicate which one of the interference signal characteristic parameters is to be used by the terminal to perform the interference calculation. As shown in Table 6, the DCI bits 00 represent that a first interference signal characteristic parameter is to be activated, the DCI bits 01 represent that a second interference signal characteristic parameter is to be activated, the DCI bits 10 represent that a third interference signal characteristic parameter is to be activated, and the DCI bits 11 represent that no interference signal characteristic parameter is to be activated.

TABLE 6

DCI analysis in Scenario 6

| DCI bits | Interference signal characteristic parameter |
|---|---|
| 00 | Activating a first interference signal characteristic parameter |
| 01 | Activating a second interference signal characteristic parameter |
| 10 | Activating a third interference signal characteristic parameter |
| 11 | Not activating any interference signal characteristic parameter |

Scenario 7

The interference signal characteristic parameters may be further grouped, and two DCI bits may be used to indicate a plurality of interference signal characteristic parameters, or the plurality of interference signal characteristic parameters may be activated, as shown in Table 7. In Table 7, eight interference signal characteristic parameters have been configured for the terminal. The DCI bits 00 represent that a first interference signal characteristic parameter and a second interference signal characteristic parameter are to be activated, the DCI bits 01 represent that a third interference signal characteristic parameter and a fourth interference signal characteristic parameter are to be activated, the DCI bits 10 represent that a fifth interference signal characteristic parameter and a sixth interference signal characteristic parameter are to be activated, and the DCI bits 11 represent that a seventh interference signal characteristic parameter and an eighth interference signal characteristic parameter are to be activated.

TABLE 7

DCI analysis in Scenario 7

| DCI bits | Interference signal characteristic parameters |
|---|---|
| 00 | Activating a first and a second interference signal characteristic parameters |
| 01 | Activating a third and a fourth interference signal characteristic parameters |
| 10 | Activating a fifth and a sixth interference signal characteristic parameters |
| 11 | Activating a seventh and an eighth interference signal characteristic parameters |

Scenario 8

The interference signal characteristic parameters may be further grouped, and two DCI bits may be used to indicate a plurality of interference signal characteristic parameters, or the plurality of interference signal characteristic parameter may be activated, as shown in Table 8. In Table 8, six interference signal characteristic parameters have been configured for the terminal. The DCI bits 00 represent that a first interference signal characteristic parameter and a second interference signal characteristic parameter are to be activated, the DCI bits 01 represent that a third interference signal characteristic parameter and a fourth interference signal characteristic parameter are to be activated, the DCI bits 10 represent that a fifth interference signal characteristic parameter and a sixth interference signal characteristic parameter are to be activated, and the DCI bits 11 represent that no interference signal characteristic parameter is to be activated.

TABLE 8

DCI analysis in Scenario 8

| DCI bits | Interference signal characteristic parameters |
|---|---|
| 00 | Activating a first and a second interference signal characteristic parameters |
| 01 | Activating a third and a fourth interference signal characteristic parameters |
| 10 | Activating a fifth and a sixth interference signal characteristic parameters |
| 11 | Not activating any interference signal characteristic parameter |

Apart from the DCI bits, a DCI bitmap may also be used to indicate the interference signal characteristic parameters to be used by the terminal to perform the interference measurement and calculation. In the bitmap, each bit corresponds to one interference signal characteristic parameter. In the case that a DCI bit is 1, the terminal needs to use the interference signal characteristic parameter to perform the interference measurement and calculation, and otherwise, the interference signal characteristic parameter may not be used.

Several modes for determining the interference measurement parameters, the interference measurement CSI-RSs and the interference signal characteristic parameters to be used by the terminal have been described hereinabove.

The terminal may receive from the network device indication information indicating one or more of the followings: one or more groups of interference measurement parameters to be used by the terminal, one or more interference measurement CSI-RSs in each group of interference measurement parameters to be used by the terminal, and one or more interference signal characteristic parameters corresponding to each interference measurement CSI-RS to be used by the terminal.

With respect to one or more interference measurement CSI-RSs corresponding to each interference source base station configured by the network device for the terminal, the network device may configure configuration information about the interference measurement CSI-RSs for the terminal. Each interference measurement CSI-RS is an interference measurement CSI-RS from one interference source base station of the terminal. The configuration information about each interference measurement CSI-RS includes such parameters of the interference measurement CSI-RS as transmission period, subframe offset, sequence and power.

Each interference signal characteristic parameter corresponding to each interference measurement CSI-RS configured by the network device for the terminal may include a correlation matrix of a signal from the interference source base station, or a set of pre-coding matrices used by the interference source base station for the data transmission. A pre-coding matrix used by the terminal for the subsequent data transmission is selected from the set of pre-coding matrices.

In the case that each interference signal characteristic parameter includes the correlation matrix of the signal from the interference source base station, i.e., a covariance matrix, $R=E\{xx^H\}$, where R represents the correlation matrix of the signal, and x represents the signal from the interference source base station. In the case that the data to be transmitted is pre-processed by the interference source base station using the pre-coding matrix, $x=Ws$, where $s=[s_1, s_2, \ldots, s_K]$, s represents source data from the interference source base station, and W represents the pre-coding matrix for the transmission an interference signal. In the case that $E\{ss^H\}=a\,I$ (where I represents a unit matrix and a represents a scalar), $R=E\{xx^H\}=aWW^H$. For the network device, a spatial characteristic and/or strength of the signal from the interference source base station may be represented by the interference signal characteristic parameter. To be specific, the spatial characteristic, or the strength, or both of them (e.g., a direction or a strength of an interference signal from a neighboring cell), of the signal from the interference source base station may be represented by the interference signal characteristic parameter.

In the case that each interference signal characteristic parameter includes a set of pre-coding matrices used by the interference source base station for the data transmission, the set of pre-coding matrices is $\{W_1, W_2, \ldots, W_P\}$. A PMI refers to an index of the pre-coding matrix, and it is directed to a predefined set of pre-coding matrices, i.e., a codebook. The PMIs correspond to elements in the codebook respectively. Hence, the set of pre-coding matrices may also be expressed as a set of PMIs, i.e., $\{PMI1, PMI2, \ldots, PIMP\}$. Optionally, with respect to each PMI in the set of PMIs, the base station may configure a weighting factor for it, so as to represent a probability of use of the PMI in the subsequent transmission, or transmission power corresponding to the PMI, or a ratio of the transmission power to total transmission power.

As mentioned above, the network device may configure the interference measurement parameters, or the interference measurement CSI-RS and the interference signal characteristic parameter as well as the correspondence therebetween, for the terminal. In addition, the above steps may be performed by the terminal prior to or subsequent to the interference measurement.

In the embodiments of the present disclosure, the terminal may perform the parameter configuration, and then perform the interference measurement, so as to acquire the initial interference measurement result.

In LTE Release 8 to LTE Release 10 systems, the terminal may perform the interference measurement on the basis of a conventional CRS or CSI-RS, so as to acquire the initial interference measurement result. In an LTE Release 11 system, the network device may configure for the terminal the dedicated IMR for the terminal, and then the terminal may perform the interference measurement on the IMR, so as to acquire the initial interference measurement result.

Optionally, in the case that there are coordination base stations for the terminal, the initial interference measurement result acquired by the terminal is interference from a base station other than a set of the coordination base stations. The interference source base stations corresponding to the interference measurement parameters configured by the network device are the coordination base stations for the terminal.

In another possible embodiment of the present disclosure, in the case that the terminal performs data transmission with another terminal based on single-cell, multiple-user Multiple-Input Multiple-Output (MIMO), the terminal may perform the interference measurement so as to acquire the interference from a base station other than a serving base station for the terminal as the initial interference measurement result. The other terminal is located within a serving cell identical to the terminal, and may occupy time-frequency resources identical to the terminal. The interference source base station corresponding to the interference measurement parameter configured by the network device is the serving base station for the terminal.

Upon the acquisition of the initial interference measurement result, the terminal may measure a channel matrix from the interference source base station corresponding to each interference measurement CSI-RS to the terminal.

To be specific, the terminal may measure interference channels from the interference source base station to the terminal based on the interference measurement CSI-RS. Optionally, in the case that a plurality of groups of interference measurement parameters has been configured for the terminal, the terminal may measure the interference channels from the interference source base station to the terminal based on each interference measurement CSI-RS in each group of interference measurement parameters, and further perform channel estimation, so as to acquire the channel matrix from the terminal to the interference source base station.

The terminal may determine total interference based on the initial interference measurement result, the channel matrix and the interference signal characteristic parameter, and then determine the CSI based on the total interference. The total interference is a sum of a result acquired based on the channel matrix and the interference signal characteristic parameter and the initial interference measurement result.

The terminal may determine the total interference based on the initial interference measurement result, the channel matrix and the interference signal characteristic parameter using the following formula:

$$Z = Z_0 + \sum_{n=1}^{N} \sum_{m=1}^{M} \sum_{k=1}^{K} G_{n,m} X_{n,m,k} G_{n,m}^{H}, \qquad (1)$$

where Z represents the total interference, $Z_0$ represents the initial interference measurement result, n represents a set number of the interference measurement parameters and has a value within the range of [1, N], N represents the total number of the groups of interference measurement parameters, m represents an index number of the interference measurement CSI-RS and has a value within the range of [1, M], M represents the total number of the interference measurement CSI-RSs in each group of interference measurement parameters, k represents an index number of the interference signal characteristic parameter corresponding to each interference measurement CSI-RS and has a value within the range of [1, K], K represents the total number of the interference signal characteristic parameters corresponding to each interference measurement CSI-RS, $G_{n,\,m}$ represents the channel matrix from the interference source base station to the terminal measured based on an $m^{th}$ interference measurement CSI-RS in an $n^{th}$ group of interference measurement parameters, $X_{n,m,k}$ represents a $k^{th}$ interference signal characteristic parameter corresponding to the $m^{th}$ interference measurement CSI-RS in the $n^{th}$ group of interference measurement parameters, and $G_{n,m}{}^H$ represents a conjugate transposed matrix of $G_{n,m}$.

The formula (1) is suitable for a situation where each group of interference measurement parameters includes M interference measurement CSI-RSs and each interference measurement CSI-RS corresponds to K interference signal characteristic parameters. In the case that the number of the interference measurement CSI-RSs included in each group of interference measurement parameters is different and the number of the interference signal characteristic parameters corresponding to each interference measurement CSI-RS is different too, the following formula (2) may be applied.

The terminal may determine the total interference based on the initial interference measurement result, the channel matrix and the interference signal characteristic parameter using the following formula:

$$Z = Z_0 + \sum_{n=1}^{N} \sum_{m=1}^{M_n} \sum_{k=1}^{K_{n,m}} G_{n,m} X_{n,m,k} G_{n,m}^H, \quad (2)$$

where Z represents the total interference, $Z_0$ represents the initial interference measurement result, n represents a set number of the interference measurement parameters and has a value within the range of [1, N], N represents the total number of the groups of the interference measurement parameters, m represents an index number of the interference measurement CSI-RS and has a value within the range of [1, $M_n$], $M_n$ represents the total number of the interference measurement CSI-RSs in an $n^{th}$ group of interference measurement parameters, k represents an index number of the interference signal characteristic parameter and has a value within the range of [1, $K_{n,m}$], $K_{n,m}$ represents the total number of the interference signal characteristic parameters corresponding to an $m^{th}$ interference measurement CSI-RS in the $n^{th}$ group of interference measurement parameters, $G_{n,m}$ represents the channel matrix from the interference source base station to the terminal measured based on the $m^{th}$ interference measurement CSI-RS in the $n^{th}$ set of interference measurement parameters, $X_{n,m,k}$ represents a $k^{th}$ interference signal characteristic parameter corresponding to the $m^{th}$ interference measurement CSI-RS in the $n^{th}$ group of interference measurement parameters, and $G_{n,m}{}^H$ represents a conjugate transposed matrix of $G_{n,m}$.

In the interference signal characteristic parameter includes the correlation matrix of the signal from the interference source base station, the following formulae may be used to calculate the total interference.

In the case that the interference signal characteristic parameter includes the correlation matrix of the signal from the interference source base station, the network device has merely configured a corresponding group of interference measurement parameters for one interference source base station, the group of the interference measurement parameters merely includes one interference measurement CSI-RS and the interference measurement CSI-RS merely corresponds to one interference signal characteristic parameter, the terminal may determine the total interference based on the initial interference measurement result, the channel matrix and the interference signal characteristic parameter using the following formula: $Z=Z_0+GRG^H$ (3), where Z represents the total interference, $Z_0$ represents the initial interference measurement result, G represents the channel matrix from the interference source base station to the terminal measured based on the interference measurement CSI-RS in the group of the interference measurement parameters, R represents the correlation matrix of the signal from the interference source base station, and $G^H$ represents a conjugate transposed matrix of G.

In the case that the interference signal characteristic parameter includes the correlation matrix of the signal from the interference source base station, the network device has configured the interference measurement parameters for a plurality of interference source base stations, each interference source base station has been configured with a corresponding set of interference measurement parameters, each set of interference measurement parameters includes one interference measurement CSI-RS and the interference measurement CSI-RS merely corresponds to one interference signal characteristic parameter, the terminal may determine the total interference based on the initial interference measurement result, the channel matrix and the interference signal characteristic parameter using the following formula:

$$Z = Z_0 + \sum_{n=1}^{N} G_n R_n G_n^H, \quad (4)$$

where Z represents the total interference, $Z_0$ represents the initial interference measurement result, n represents a set number of the interference measurement parameters and has a value within the range of [1, N], N represents the total number of the groups of interference measurement parameters, $G_n$ represents the channel matrix from the interference source base station to the terminal measured based on the interference measurement CSI-RS in an $n^{th}$ group of interference measurement parameters, $R_n$ represents the correlation matrix of the signal from the interference source base station corresponding to the $n^{th}$ group of interference measurement parameters, and $G_n{}^H$ represents a conjugate transposed matrix of $G_n$.

In the case that the interference signal characteristic parameter includes the correlation matrix of the signal from the interference source base station, the network device has configured the interference measurement parameter for one interference source base station, the interference source base station has been configured with a corresponding group of interference measurement parameters, the group of interference measurement parameters merely includes one interference measurement CSI-RS and the interference measurement CSI-RS merely corresponds to a plurality of interference signal characteristic parameters, the terminal may determine the total interference based on the initial interference measurement result, the channel matrix and the interference signal characteristic parameter using the following formula:

$$Z = Z_0 + \sum_{k=1}^{K} GR_k G^H, \quad (5)$$

where Z represents the total interference, $Z_0$ represents the initial interference measurement result, k represents an index number of the interference signal characteristic parameter corresponding to each interference measurement CSI-RS and has a value within the range of [1, K], K represents the total number of the interference signal characteristic parameters corresponding to each interference measurement CSI-RS, G represents the channel matrix from the source base station to the terminal measured based on the interference measurement CSI-RS in the group of the interference measurement parameters, $R_k$ represents the correlation matrix of a $k^{th}$ signal from the interference source base station, and $G^H$ represents a conjugate transposed matrix of G.

In the case that the interference signal characteristic parameter includes the correlation matrix of the signal from the interference source base stations, the network device has configured the interference measurement parameters for a plurality of interference source base stations, each interference source base station has been configured with a corresponding group of interference measurement parameters, each group of interference measurement parameters includes a plurality of interference measurement CSI-RSs and each interference measurement CSI-RS corresponds to a plurality of interference signal characteristic parameters, the terminal may determine the total interference based on the initial interference measurement result, the channel matrix and the interference signal characteristic parameter using the following formula:

$$Z = Z_0 + \sum_{n=1}^{N} \sum_{m=1}^{M} \sum_{k=1}^{K} G_{n,m} R_{n,m,k} G_{n,m}^H, \quad (6)$$

where Z represents the total interference, $Z_0$ represents the initial interference measurement result, n represents a set number of the interference measurement parameters and has a value within the range of [1, N], N represents the total number of the groups of the interference measurement parameters, m represents an index number of the interference measurement CSI-RS and has a value within the range of [1, M], M represents the total number of the interference measurement CSI-RSs in each group of interference measurement parameters, k represents an index number of the interference signal characteristic parameter corresponding to each interference measurement CSI-RS and has a value within the range of [1, K], K represents the total number of the interference signal characteristic parameters corresponding to each interference measurement CSI-RS, $G_{n,m}$ represents the channel matrix from the interference source base station to the terminal measured based on an $m^{th}$ interference measurement CSI-RS in an $n^{th}$ group of interference measurement parameters, $R_{n,m,k}$ represents the correlation matrix of a $k^{th}$ signal from the interference source base station corresponding to the $m^{th}$ interference measurement CSI-RS in the $n^{th}$ group of interference measurement parameters, and $G_{n,m}^H$ represents a conjugate transposed matrix of $G_{n,m}$.

The formula (6) is suitable for a situation where each set of interference measurement parameters includes M interference measurement CSI-RSs and each interference measurement CSI-RS corresponds to K interference signal characteristic parameters. In the case that the number of the interference measurement CSI-RSs included in each set of interference measurement parameters is different and the number of the interference signal characteristic parameters corresponding to each set of interference measurement parameters is different too, the following formula (7) may be applied.

In the case that the interference signal characteristic parameter includes the correlation matrix of the signal from the interference source base station, the network device has configured the interference measurement parameters for a plurality of interference source base stations, each interference source base station has been configured with a corresponding set of interference measurement parameters, each set of interference measurement parameters includes a plurality of interference measurement CSI-RSs and each interference measurement CSI-RS corresponds to a plurality of interference signal characteristic parameters, the terminal may determine the total interference based on the initial interference measurement result, the channel matrix and the interference signal characteristic parameter using the following formula:

$$Z = Z_0 + \sum_{n=1}^{N} \sum_{m=1}^{M_n} \sum_{k=1}^{K_{n,m}} G_{n,m} R_{n,m,k} G_{n,m}^H, \quad (7)$$

where Z represents the total interference, $Z_0$ represents the initial interference measurement result, n represents a set number of the interference measurement parameters and has a value within the range of [1, N], N represents the total number of the groups of interference measurement parameters, m represents an index number of the interference measurement CSI-RS and has a value within the range of [1, $M_n$], $M_n$ represents the total number of the interference measurement CSI-RSs in an $n^{th}$ set of interference measurement parameters, k represents an index number of the interference signal characteristic parameter corresponding to each interference measurement CSI-RS and has a value within the range of [1, $K_{n,m}$], $K_{n,m}$ represents the total number of the interference signal characteristic parameters corresponding to an $m^{th}$ interference measurement CSI-RS in the $n^{th}$ group of interference measurement parameters, $G_{n,m}$ represents the channel matrix from the interference source base station to the terminal measured based on the $m^{th}$ interference measurement CSI-RS in the $n^{th}$ group of interference measurement parameters, $R_{n,m,k}$ represents the correlation matrix of a $k^{th}$ signal from the interference source base station corresponding to the $m^{th}$ interference measurement CSI-RS in the $n^{th}$ group of interference measurement parameters, and $G_{n,m}^H$ represents a conjugate transposed matrix of $G_{n,m}$.

It should be appreciated that, in the case that N, M and K are each equal to 1, the formula (6) may be simplified into the formula (3); in the case that N is greater than 1 and M and K are each equal to 1, the formula (6) may be simplified into the formula (4); and in the case that N and M are each equal to 1 and K is greater than 1, the formula (6) may be simplified into the formula (5).

In the case that the interference signal characteristic parameter includes a set of pre-coding matrices used by the interference source base station for the data transmission, the total interference may be calculated using the following formulae.

In the case that the interference signal characteristic parameter includes a set of pre-coding matrices $\{W_1, W_2, \ldots, W_P\}$ used by the interference source base station for the data transmission, the network device has merely configured a corresponding set of interference measurement parameters for one interference source base station, the set of interference measurement parameters merely includes one interference measurement CSI-RS and the interference measurement CSI-RS merely corresponds to one interference signal characteristic parameter, the terminal may determine the total interference based on the initial interference measurement result, the channel matrix and the interference signal characteristic parameter using the following formula:

$$Z = Z_0 + G\left(\sum_{p=1}^{P} W_p W_p^H\right) G^H, \qquad (8)$$

where Z represents the total interference, $Z_0$ represents the initial interference measurement result, G represents the channel matrix from the interference source base station to the terminal measured based on the interference measurement CSI-RS in the group of interference measurement parameters, p represents an index number of the pre-coding matrix used by the interference source base station for the data transmission and has a value within the range of [1, P], P represents the number of the pre-coding matrices used by the interference source base stations for the data transmission, $W_p$ represents a $p^{th}$ pre-coding matrix used by the interference source base station for the data transmission, $W_p^H$ represents a conjugate transposed matrix of $W_p$, and $G^H$ represents a conjugate transposed matrix of G.

In the case that the interference signal characteristic parameter includes a set of pre-coding matrices $\{W_1, W_2, \ldots, W_P\}$ used by the interference source base station for the data transmission, the base station has configured a weighting factor for each pre-coding matrix based on a probability of use of the pre-coding matrix in the subsequent data transmission, the network device has merely configured a corresponding set of interference measurement parameters for one interference source base station, the set of interference measurement parameters merely includes one interference measurement CSI-RS and the interference measurement CSI-RS merely corresponds to one interference signal characteristic parameter, the terminal may determine the total interference based on the initial interference measurement result, the channel matrix and the interference signal characteristic parameter using the following formula:

$$Z = Z_0 + G\left(\sum_{p=1}^{P} \alpha_p W_p W_p^H\right) G^H, \qquad (9)$$

where Z represents the total interference, $Z_0$ represents the initial interference measurement result, G represents the channel matrix from the interference source base station to the terminal measured based on the interference measurement CSI-RS in the group of interference measurement parameters, p represents an index number of the pre-coding matrix used by the interference source base station for the data transmission and has a value within the range of [1, P], P represents the total number of the pre-coding matrices used by the interference source base stations for the data transmission, $\alpha_p$ represents a weighting factor of a $p^{th}$ pre-coding matrix used by the interference source base station for the data transmission, $W_p$ represents the $p^{th}$ pre-coding matrix used by the interference source base station for the data transmission, $W_p^H$ represents a conjugate transposed matrix of $W_p$, and $G^H$ represents a conjugate transposed matrix of G.

In the case that the interference signal characteristic parameter includes a set of pre-coding matrices $\{W_1, W_2, \ldots, W_P\}$ used by the interference source base station for data transmission, the network device has configured the interference measurement parameters for a plurality of interference source base stations, each interference source base station has been configured with a set of interference measurement parameters, each set of interference measurement parameters includes one interference measurement CSI-RS and the interference measurement CSI-RS merely corresponds to one interference signal characteristic parameter, the terminal may determine the total interference based on the initial interference measurement result, the channel matrix and the interference signal characteristic parameter using the following formula:

$$Z = Z_0 + \sum_{n=1}^{N} G_n\left(\sum_{p=1}^{P} W_{n,p} W_{n,p}^H\right) G_n^H, \qquad (10)$$

where Z represents the total interference, $Z_0$ represents the initial interference measurement result, n represents a group number of the interference measurement parameters and has a value within the range of [1, N], N represents the total number of the groups of interference measurement parameters, $G_n$ represents the channel matrix from the interference source base station to the terminal measured based on the interference measurement CSI-RS in an $n^{th}$ group of interference measurement parameters, P represents an index number of the pre-coding matrix used by the interference source base station for the data transmission and has a value within the range of [1, P] represents the total number of the pre-coding matrices used by the interference source base stations for the data transmission, $W_{n,p}$ represents a $p^{th}$ pre-coding matrix used by the interference source base station corresponding to the $n^{th}$ set of interference measurement parameters for the data transmission, $W_{n,p}^H$ represents a conjugate transposed matrix of $W_{n,p}$, and $G_n^H$ represents a conjugate transposed matrix of $G_n$.

In the case that the interference signal characteristic parameter includes a set of pre-coding matrices $\{W_1, W_2, \ldots, W_P\}$ used by the interference source base station for the data transmission, the base station has configured a weighting factor for each pre-coding matrix based on a probability of use of the pre-coding matrix in the subsequent data transmission, the network device has configured the interference measurement parameters for a plurality of interference source base stations, each interference source base station has been configured with a group of interference measurement parameters, each group of interference measurement parameters merely includes one interference measurement CSI-RS and the interference measurement CSI-RS merely corresponds to one interference signal characteristic parameter, the terminal may determine the total interference based on the initial interference measurement result, the channel matrix and the interference signal characteristic parameter using the following formula:

$$Z = Z_0 + \sum_{n=1}^{N} G_n \left( \sum_{p=1}^{P} \alpha_{n,p} W_{n,p} W_{n,p}^H \right) G_n^H, \quad (11)$$

where Z represents the total interference, $Z_0$ represents the initial interference measurement result, k represents an index number of the interference signal characteristic parameter corresponding to each interference measurement CSI-RS and has a value within the range of [1, K], K represents the total number of the interference signal characteristic parameters corresponding to each interference measurement CSI-RS, G represents the channel matrix from the interference source base station to the terminal measured based on the interference measurement CSI-RS in the group of interference measurement parameters, p represents an index number of the pre-coding matrix used by the interference source base station for the data transmission and has a value within the range of [1, P], P represents the total number of the pre-coding matrices used by the interference source base stations for the data transmission, $\alpha_{n,p}$ represents a weighting factor of a $p^{th}$ pre-coding matrix used by the interference source base station corresponding to an $n^{th}$ set of interference measurement parameters for the data transmission, $W_{n,p}$ represents the $p^{th}$ pre-coding matrix used by the interference source base station corresponding to the $n^{th}$ set of interference measurement parameters for the data transmission, $W_{n,p}^H$ represents a conjugate transposed matrix of $W_{n,p}$, and $G^H$ represents a conjugate transposed matrix of G.

In the case that the interference signal characteristic parameter includes a set of pre-coding matrices $\{W_1, W_2, \ldots, W_P\}$ used by the interference source base station for the data transmission, the network device has configured the interference measurement parameters for one interference source base station, the interference source base station has been configured with a corresponding group of interference measurement parameters, the group of interference measurement parameters merely includes one interference measurement CSI-RS and the interference measurement CSI-RS corresponds to a plurality of interference signal characteristic parameters, the terminal may determine the total interference based on the initial interference measurement result, the channel matrix and the interference signal characteristic parameter using the following formula:

$$Z = Z_0 + \sum_{k=1}^{K} G \left( \sum_{p=1}^{P} W_{k,p} W_{k,p}^H \right) G^H, \quad (12)$$

where Z represents the total interference, $Z_0$ represents the initial interference measurement result, k represents an index number of the interference signal characteristic parameter corresponding to each interference measurement CSI-RS and has a value within the range of [1, K], K represents the total number of the interference signal characteristic parameters corresponding to each interference measurement CSI-RS, G represents the channel matrix from the interference source base station to the terminal measured based on the interference measurement CSI-RS in the group of interference measurement parameters, p represents an index number of the pre-coding matrix used by the interference source base station for the data transmission and has a value within the range of [1, P], P represents the total number of the pre-coding matrices used by the interference source base stations for the data transmission, $W_{k,p}$ represents a $p^{th}$ pre-coding matrix used by the interference source base station corresponding to a $k^{th}$ interference signal characteristic parameter for the data transmission, $W_{k,p}^H$ represents a conjugate transposed matrix of $W_{k,p}$, and $G^H$ represents a conjugate transposed matrix of G.

In the case that the interference signal characteristic parameter includes a set of pre-coding matrices $\{W_1, W_2, \ldots, W_P\}$ used by the interference source base station for the data transmission, the base station has configured a weighting factor for each pre-coding matrix based on a probability of use of the pre-coding matrix in the subsequent data transmission, the network device has configured the interference measurement parameters for one interference source base station, the interference source base station has been configured with a corresponding set of interference measurement parameters, the set of interference measurement parameters merely includes one interference measurement CSI-RS and the interference measurement CSI-RS merely corresponds to a plurality of interference signal characteristic parameters, the terminal may determine the total interference based on the initial interference measurement result, the channel matrix and the interference signal characteristic parameter using the following formula:

$$Z = Z_0 + \sum_{k=1}^{K} G \left( \sum_{p=1}^{P} \alpha_{k,p} W_{k,p} W_{k,p}^H \right) G^H, \quad (13)$$

where Z represents the total interference, $Z_0$ represents the initial interference measurement result, k represents an index number of the interference signal characteristic parameter corresponding to each interference measurement CSI-RS and has a value within the range of [1, K], K represents the total number of the interference signal characteristic parameters corresponding to each interference measurement CSI-RS, G represents the channel matrix from the interference source base station to the terminal measured based on the interference measurement CSI-RS in the group of interference measurement parameters, p represents an index number of the pre-coding matrix used by the interference source base station for the data transmission and has a value within the range of [1, P], P represents the total number of the pre-coding matrices used by the interference source base stations for the data transmission, $\alpha_{k,p}$ represents a weighting factor of a $p^{th}$ pre-coding matrix used by the interference source base station corresponding to a $k^{th}$ interference signal characteristic parameter for the data transmission, $W_{k,p}$ represents the $p^{th}$ pre-coding matrix used by the interference source base station corresponding to the $k^{th}$ interference signal characteristic parameter for the data transmission, $W_{k,p}^H$ represents a conjugate transposed matrix of $W_{k,p}$, and $G^H$ represents a conjugate transposed matrix of G.

In the case that the interference signal characteristic parameter includes a set of pre-coding matrices $\{W_1, $W_2, \ldots, W_P\}$ used by the interference source base station for the data transmission, the network device has configured the interference measurement parameters for a plurality of interference source base stations, each interference source base station has been configured with a plurality of groups of interference measurement parameters, each group of interference measurement parameters includes a plurality of interference measurement CSI-RSs and each interference measurement CSI-RS corresponds to a plurality of interference signal characteristic parameters, the terminal may determine the total interference based on the initial interference measurement result, the channel matrix and the interference signal characteristic parameter using the following formula:

$$Z = Z_0 + \sum_{n=1}^{N}\sum_{m=1}^{M}\sum_{k=1}^{K} G_{n,m}\left(\sum_{p=1}^{P} W_{n,m,k,p} W_{n,m,k,p}^{H}\right) G_{n,m}^{H}, \quad (14)$$

where Z represents the total interference, $Z_0$ represents the initial interference measurement result, n represents a group number of the interference measurement parameters and has a value within the range of [1, N], N represents the total number of the groups of the interference measurement parameters, m represents an index number of the interference measurement CSI-RS and has a value within the range of [1, M], M represents the total number of the interference measurement CSI-RSs in each group of interference measurement parameters, k represents an index number of the interference signal characteristic parameter corresponding to each interference measurement CSI-RS and has a value within the range of [1, K], K represents the total number of the interference signal characteristic parameters corresponding to each interference measurement CSI-RS, $G_{n,m}$ represents the channel matrix from the interference source base station to the terminal measured based on an $m^{th}$ interference measurement CSI-RS in an $n^{th}$ group of interference measurement parameters, P represents an index number of the pre-coding matrix used by the interference source base station for the data transmission and has a value within the range of [1, P], P represents the total number of the pre-coding matrices used by the interference source base stations for the data transmission, $W_{n,m,k,p}$ represents a $p^{th}$ pre-coding matrix used by the interference source base station corresponding to a $k^{th}$ interference signal characteristic parameter in the $n^{th}$ set of interference measurement parameters for the data transmission, $W_{n,m,k,p}^{H}$ represents a conjugate transposed matrix of $W_{n,m,k,p}$, and $G_{n,m}^{H}$ represents a conjugate transposed matrix of $G_{n,m}$.

In the case that the interference signal characteristic parameter includes a set of pre-coding matrices $\{W_1, W_2, \ldots, W_P\}$ used by the interference source base station for the data transmission, the base station has configured a weighting factor for each pre-coding matrix based on a probability of use of the pre-coding matrix in the subsequent data transmission, the network device has configured the interference measurement parameters for a plurality of interference source base stations, each interference source base station has been configured with a plurality of groups of interference measurement parameters, each set of interference measurement parameters includes a plurality of interference measurement CSI-RSs and each interference measurement CSI-RS corresponds to a plurality of interference signal characteristic parameters, the terminal may determine the total interference based on the initial interference measurement result, the channel matrix and the interference signal characteristic parameter using the following formula:

$$Z = Z_0 + \sum_{n=1}^{N}\sum_{m=1}^{M}\sum_{k=1}^{K} G_{n,m}\left(\sum_{p=1}^{P} \alpha_{n,m,k,p} W_{n,m,k,p} W_{n,m,k,p}^{H}\right) G_{n,m}^{H}, \quad (15)$$

where Z represents the total interference, $Z_0$ represents the initial interference measurement result, n represents a group number of the interference measurement parameters and has a value within the range of [1, N], N represents the total number of the groups of the interference measurement parameters, m represents an index number of the interference measurement CSI-RS and has a value within the range of [1, M], M represents the total number of the interference measurement CSI-RSs in each group of interference measurement parameters, k represents an index number of the interference signal characteristic parameter corresponding to each interference measurement CSI-RS and has a value within the range of [1, K], K represents the total number of the interference signal characteristic parameters corresponding to each interference measurement CSI-RS, $G_{n,m}$ represents the channel matrix from the interference source base station to the terminal measured based on an $m^{th}$ interference measurement CSI-RS in an $n^{th}$ group of interference measurement parameters, P represents an index number of the pre-coding matrix used by the interference source base station for the data transmission and has a value within the range of [1, P], P represents the total number of the pre-coding matrices used by the interference source base stations for the data transmission, $\alpha_{n,m,k,p}$ represents a weighting factor of a $p^{th}$ pre-coding matrix used by the interference source base station corresponding to a $k^{th}$ interference signal characteristic parameter correspond to the $m^{th}$ interference measurement CSI-RS in the $n^{th}$ group of interference measurement parameters for the data transmission, $W_{n,m,k,p}$ represents the $p^{th}$ pre-coding matrix used by the interference source base station corresponding to the $k^{th}$ interference signal characteristic parameter correspond to the $m^{th}$ interference measurement CSI-RS in the $n^{th}$ group of interference measurement parameters for the data transmission, $W_{n,m,k,p}^{H}$ represents a conjugate transposed matrix of $W_{n,m,k,p}$, and $G_{n,m}^{H}$ represents a conjugate transposed matrix of $G_{n,m}$.

The formula (14) is suitable for a situation where each group of interference measurement parameter includes M interference measurement CSI-RSs and each interference measurement CSI-RS corresponds to K interference signal characteristic parameters. However, in the case that the number of the interference measurement CSI-RSs included in each group of interference measurement parameters is different and the number of the interference signal characteristic parameters corresponding to each interference measurement CSI-RS is different too, the following formula (16) may be applied.

In the case that the interference signal characteristic parameter includes a set of pre-coding matrices $\{W_1, W_2, \ldots, W_P\}$ used by the interference source base station for the data transmission, the network device has merely configured a corresponding group of interference measurement parameters for one interference source base station, the set of interference measurement parameters merely includes one interference measurement CSI-RS and the interference measurement CSI-RS merely corresponds to one interference signal characteristic parameter, the terminal may determine the total interference based on the initial interference measurement result, the channel matrix and the interference signal characteristic parameter using the following formula:

$$Z = Z_0 + \sum_{n=1}^{N} \sum_{m=1}^{M_n} \sum_{k=1}^{K_{n,m}} G_{n,m} \left( \sum_{p=1}^{P} W_{n,m,k,p} W_{n,m,k,p}^H \right) G_{n,m}^H, \quad (16)$$

where Z represents the total interference, $Z_0$ represents the initial interference measurement result, n represents a set number of the interference measurement parameters and has a value within the range of [1, N], N represents the total number of the groups of the interference measurement parameters, m represents an index number of the interference measurement CSI-RS and has a value within the range of [1, $M_n$], $M_n$ represents the total number of the interference measurement CSI-RSs in an $n^{th}$ group of interference measurement parameters, k represents an index number of the interference signal characteristic parameter and has a value within the range of [1, $K_{n,m}$], $K_{n,m}$ represents the total number of the interference signal characteristic parameters corresponding to an $m^{th}$ interference measurement CSI-RS in the $n^{th}$ group of interference measurement parameters, $G_{n,m}$ represents the channel matrix from the interference source base station to the terminal measured based on the $m^{th}$ interference measurement CSI-RS in the $n^{th}$ group of interference measurement parameters, p represents an index number of the pre-coding matrix used by the interference source base station for the data transmission and has a value within the range of [1, P], P represents the total number of the pre-coding matrices used by the interference source base stations for the data transmission, $W_{n,m,k,p}$ represents a pth pre-coding matrix used by the interference source base station corresponding to a $k^{th}$ interference signal characteristic parameter corresponding to the $m^{th}$ interference measurement CSI-RS in the $n^{th}$ set of interference measurement parameters for the data transmission, $W_{n,m,k,p}^H$ represents a conjugate transposed matrix of $W_{n,m,k,p}$, and $G_{n,m}^H$ represents a conjugate transposed matrix of $G_{n,m}$.

The formula (16) is suitable for a situation where each group of interference measurement parameters includes M interference measurement CSI-RSs and each interference measurement CSI-RS corresponds to K interference signal characteristic parameter. However, in the case that the number of the interference measurement CSI-RSs included in each group of interference measurement parameter is different and the number of the interference signal characteristic signals corresponding to each interference measurement CSI-RS is different too, the following formula (17) may be applied.

In the case that the interference signal characteristic parameter includes a set of pre-coding matrices {$W_1$, $W_2$, ..., $W_P$} used by the interference source base station for the data transmission, the base station has configured a weighting factor for each pre-coding matrix based on a probability of use of the pre-coding matrix in the subsequent data transmission, the network device has configured the interference measurement parameters for a plurality of interference source base stations, each interference source base station has been configured with a plurality of groups of interference measurement parameters, each group of interference measurement parameters includes a plurality of interference measurement CSI-RSs and each interference measurement CSI-RS corresponds to a plurality of interference signal characteristic parameters, the terminal may determine the total interference based on the initial interference measurement result, the channel matrix and the interference signal characteristic parameter using the following formula:

$$Z = Z_0 + \sum_{n=1}^{N} \sum_{m=1}^{M_n} \sum_{k=1}^{K_{n,m}} G_{n,m} \left( \sum_{p=1}^{P} \alpha_{n,m,k,p} W_{n,m,k,p} W_{n,m,k,p}^H \right) G_{n,m}^H, \quad (17)$$

where Z represents the total interference, $Z_0$ represents the initial interference measurement result, n represents a set number of the interference measurement parameters and has a value within the range of [1, N], N represents the total number of the groups of the interference measurement parameters, m represents an index number of the interference measurement CSI-RS and has a value within the range of [1, $M_n$], $M_n$ represents the total number of the interference measurement CSI-RSs in an $n^{th}$ group of interference measurement parameters, k represents an index number of the interference signal characteristic parameter and has a value within the range of [1, $K_{n,m}$], $K_{n,m}$ represents the total number of the interference signal characteristic parameters corresponding to an $m^{th}$ interference measurement CSI-RS in the $n^{th}$ group of interference measurement parameters, $G_{n,m}$ represents the channel matrix from the interference source base station to the terminal measured based on the $m^{th}$ interference measurement CSI-RS in the $n^{th}$ group of interference measurement parameters, p represents an index number of the pre-coding matrix used by the interference source base station for the data transmission and has a value within the range of [1, P], P represents the total number of the pre-coding matrices used by the interference source base stations for the data transmission, $\alpha_{n,m,k,p}$ represents a weighting factor of a $p^{th}$ pre-coding matrix used by the interference source base station corresponding to the $k^{th}$ interference signal characteristic parameter corresponding to the $m^{th}$ interference measurement CSI-RS in the $n^{th}$ group of interference measurement parameters for the data transmission, $W_{n,m,k,p}$ represents the $p^{th}$ pre-coding matrix used by the interference source base station corresponding to a $k^{th}$ interference signal characteristic parameter corresponding to the $m^{th}$ interference measurement CSI-RS in the $n^{th}$ group of interference measurement parameters for the data transmission, $W_{n,m,k,p}^H$ represents a conjugate transposed matrix of $W_{n,m,k,p}$, and $G_{n,m}^H$ represents a conjugate transposed matrix of $G_{n,m}$.

It should be appreciated that, in the case that N, M and K are each equal to 1, the formula (14) may be simplified into the formula (8); in the case that N is greater than 1 and M and K are each equal to 1, the formula (14) may be simplified into the formula (10); and in the case that N and M are each equal to 1 and K is greater than 1, the formula (14) may be simplified into the formula (12).

It should be further appreciated that, in the case that N, M and K are each equal to 1, the formula (15) may be simplified into the formula (9); in the case that N is greater than 1 and M and K are each equal to 1, the formula (15) may be simplified into the formula (11); and in the case that N and M are each equal to 1 and K is greater than 1, the formula (15) may be simplified into the formula (13).

Upon the determination of the total interference as mentioned above, the terminal may determine the CSI based on the total interference, and report the determined CSI to the network device. In the embodiments of the present disclosure, the CSI may include information such as RI, CQI and PMI.

Apart from the above, some other implementation modes may also be provided.

In one implementation mode, upon the acquisition of the initial interference measurement result, the terminal may determine the CSI based on the initial interference measurement result, adjust the determined CSI based on the interference measurement parameter configured by the network device, and then report the adjusted CSI to the network device. In this implementation mode, the adjustment of the determined CSI based on the interference measurement parameter configured by the network device may be pre-determined, e.g., the CQI in the preliminarily-determined CSI may be increased or reduced based on the interference measurement parameter.

In another implementation mode, a mapping table between the CSI and the initial interference measurement result, the interference measurement CSI-RS in the interference measurement parameter as well as the interference signal characteristic parameter may be established, then the CSI may be looked up in the mapping table based on the initial interference measurement result, the interference measurement CSI-RS and the interference signal characteristic parameter, and then the determined CSI information may be reported to the network device.

During the implementation, a CSI progress is a concept introduced into an LTE Release 11 system. One CSI progress corresponds to a CSI for the transmission hypothesis. The transmission hypothesis includes a signal hypothesis and an interference hypothesis, so one CSI process is associated with one CSI-RS and one IMR. The signal hypothesis is acquired by measuring the CSI-RS, and the interference hypothesis is acquired by measuring the IMR. According to the method in the embodiments of the present disclosure, the definition of one CSI progress may be modified as being associated with one CSI-RS and one IMR, and being associated with one or more groups of interference measurement parameters. The CSI measurement and calculation for the CSI progress may be completed using the above-mentioned methods.

As can be seen from the above implementation modes for determining the CSI, the interference measurement parameter, or the interference measurement CSI-RS as well as the interference signal characteristic parameter is configured by the network device, so it is able for the information configured by the network device to reflect an actual situation in a better manner as compared with that in the related art.

For example, the interference measurement CSI-RS configured by the network device for the terminal is provided with respect to the interference source base station for the terminal (as mentioned hereinbefore, in the case that there is the coordination base stations for the terminal, the initial interference measurement result measured by the terminal is the interference from a base station other than the set of coordination base stations and the interference source base station corresponding to the interference measurement parameter configured by the network device is the coordination base station for the terminal; in the case that the terminal performs data transmission with the other terminal on the basis of single-cell MIMO, the initial interference measurement result measured by the terminal is the interference from a base station other than the serving base station for the terminal and the interference source base station corresponding to the interference measurement parameter configured by the network device is the serving base station for the terminal), so the interference source base station for the interference measurement CSI-RS may be determined in Step 202 based on the initial measurement configuration in Step 201, and thereby the interference information may be acquired based on the initial interference measurement result in Step 201 and a measurement result acquired on the basis of the interference measurement CSI-RS in Step 202. In this way, it is able for the acquired interference information to reflect an actual situation in a better manner as compared with that in the related art.

Further, the interference signal characteristic parameter configured by the network device for the terminal includes the correlation matrix of the signal from the interference source base station, e.g., the set of pre-coding matrices used by the interference source base station for the data transmission, so it is able for the correlation matrix to reflect a data transmission situation of the interference source base station to some extent. In this way, it is able for the interference information, acquired based on the initial interference measurement result, the interference measurement result acquired on the basis of the interference measurement CSI-RS and the correlation matrix of the signal from the interference source base station, to match the interference information for the actual transmission in a better manner as compared with that in the related art.

The method will be further described hereinafter in conjunction with two examples.

Example 1

The method in this example may be applied to a multi-point coordination transmission scenario (i.e., there is a plurality of coordination cells), a serving cell for the terminal is a first cell, a set of coordination cells includes the first cell and a second cell, and the network device has configured an IMR1 for the first cell and the second cell. In the case that the first cell and the second cell are each in a silent state on the IMR1, the terminal may perform the interference measurement on the IMR1, and the acquired initial interference measurement result is just interference from a cell other than the first cell and the second cell, i.e., the initial interference measurement result is the interference generated by a base station other than those in the set of coordination base stations.

The network device may configure a group of interference measurement parameters for the terminal, and the interference source base station corresponding to this group of interference measurement parameters is just a base station for the second cell. The interference measurement CSI-RS in the group of interference measurement parameters is an interference measurement CSI-RS from the base station for the second cell. The interference signal characteristic parameter in the group of interference measurement parameters is a correlation matrix of a signal from the base station for the second cell.

At this time, the terminal measure acquire the initial interference measurement result form a cell other than the first cell and the second cell on the IMR1, acquire the interference generated by the second cell on the terminal based on the interference measurement parameter, and add the initial interference measurement result and the interference generated by the second cell on the terminal so as to acquire the total interference generated by the cells other than the first cell.

Then, the first cell may determine the CSI based on the total interference, and report the determined CSI to the network device.

Example 2

The method in this example may be applied to a single-cell, multiple-user MIMO transmission scenario, the first cell is the serving cell for the terminal, and there is a paired terminal for the terminal in the serving cell, i.e., the paired terminal and the terminal may occupy an identical time-frequency resource in the serving cell. The network device may configure an IMR2 for the terminal, and the serving cell is in the silent state on the IMR2. The interference measured by the terminal on the IMR2 is just initial interference generated by the cells other than the serving cell.

The network device may configure a set of interference measurement parameters for the terminal, the interference measurement CSI-RS in the set of interference measurement parameters is an interference measurement CSI-RS from the serving cell, and the correlation matrix of the interference signal in the set of interference measurement parameters is a correlation matrix of a signal from the serving base station to the paired terminal. The interference calculated by the terminal based on the interference measurement parameter is interference generated by a signal from the paired terminal on the terminal.

The initial interference measurement result acquired from cells other than the serving cell and the interference generated by the paired terminal on the terminal may be added, so as to acquire the total interference on the terminal.

Then, the serving cell may determine the CSI based on the total interference, and report the determined CSI to the network device.

As mentioned above, in the embodiments of the present disclosure, the terminal may perform the interference measurement to acquire the initial interference measurement result, determine the CSI based on the initial interference measurement result and the interference measurement parameter configured by the network device, and then report the determined CSI to the network device.

The interference measurement parameter is configured by the network device, so it may be used to reflect an actual situation of the interference information, and the interference information acquired by the terminal based on the interference measurement parameter may match the interference information for the actual transmission in a better manner. Upon the acquisition of the initial interference measurement result, the terminal may determine the CSI based on the initial interference measurement result and the interference information configured by the network device, and then report the determined CSI to the network device. As a result, it is able to increase a matching degree between the interference information measured by the terminal and the interference information for the actual transmission, thereby to enable the network device to select a more appropriate parameter for the link adaptation.

Figure 3:
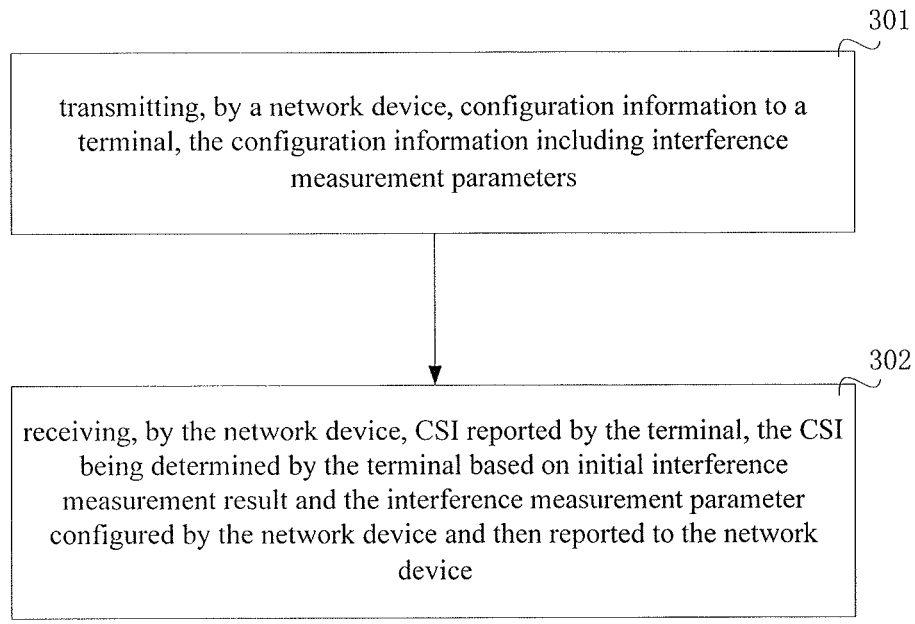
FIG. 3 is a flow chart of a CSI acquisition method in some embodiments of the present disclosure.

FIG. 3 is a flow chart of a CSI acquisition method in some embodiments of the present disclosure.

Based on an identical inventive concept, the present disclosure further provides in some embodiments a CSI acquisition method which, as shown in FIG. 3, includes: Step 301 of transmitting, by a network device, configuration information to a terminal, the configuration information including an interference measurement parameter; and Step 302 of receiving, by the network device, CSI reported by the terminal, the CSI being determined by the terminal based on initial interference measurement result and the interference measurement parameter configured by the network device and then reported to the network device.

The interference measurement parameter is configured by the network device, so it may be used to reflect an actual situation of the interference information, and the interference information acquired by the terminal based on the interference measurement parameter may match the interference information for the actual transmission in a better manner.

The network device may transmit the configuration information to the terminal in the following two modes.

Mode 1

The configuration information transmitted by the network device to the terminal may include the interference measurement parameters. Optionally, the interference measurement parameters may be grouped into one or more groups, and each group of interference measurement parameters may correspond to one interference source base station. Each group of interference measurement parameters includes one or more interference measurement CSI-RSs, and each interference measurement CSI-RS corresponds to one or more interference signal characteristic parameters. The interference measurement CSI-RS refers to a CSI-RS from one interference source base station.

The network device may receive the CSI reported by the terminal. The CSI may be determined by the terminal based on the initial interference measurement result and the interference measurement parameter configured by the network device and then reported to the network device.

Mode 2

The configuration information transmitted by the network device may merely include one or more interference measurement CSI-RSs, one or more interference signal characteristic parameters and a correspondence between each interference measurement CSI-RS and the one or more interference signal characteristic parameters. Optionally, the configuration information may further include a correspondence between each interference measurement CSI-RS and an interference source base station. In this mode, each interference source base station may correspond to one or more interference measurement CSI-RSs, and each interference measurement CSI-RS may correspond to one or more interference signal characteristic parameters. The Interference measurement CSI-RS refers to a CSI-RS from one interference source base station. At this time, the terminal may determine the CSI based on the initial interference measurement result, the interference measurement CSI-RS configured by the network device and the interference signal characteristic parameter corresponding to the interference measurement CSI-RS.

The network device may receive the CSI reported by the terminal. The CSI may be determined by the terminal based on the initial interference measurement result and the interference measurement parameter configured by the network device and then reported to the network device.

In Mode 2, the one or more interference measurement CSI-RSs corresponding to each interference source base station and the one or more interference signal characteristic parameters corresponding to each CSI-RS may be considered as a group of interference measurement parameters in Mode 1. The following description will be given by taking Mode 1 as an example, and a person skilled in the art may, based on this correspondence, replace terms in the group of interference measurement parameters with the one or more interference measurement CSI-RSs corresponding to each interference source base station and the one or more interference signal characteristic parameters corresponding to each CSI-RS in Mode 2.

In the embodiments of the present disclosure, in the case that a plurality of groups of interference measurement parameters has been configured, the terminal may perform the interference measurement and calculation based on all the interference measurement parameters, or the interference measurement parameters, the interference measurement CSI-RSs and the interference signal characteristic parameters to be used by the terminal may be indicated through high-layer signaling or DCI.

Optionally, one or more of the followings may be indicated in the DCI: one or more groups of interference measurement parameters to be used by the terminal, one or more interference measurement CSI-RSs in each set of interference measurement parameters to be used by the terminal, and one or more interference signal characteristic parameters corresponding to each interference measurement CSI-RS to be used by the terminal. In other words, the DCI may be used to indicate the terminal to use which one or more groups of interference measurement parameters to perform the interference measurement and calculation, or which one or more groups of interference measurement parameters may be activated. In the case that each group of interference measurement parameters includes one or more interference measurement CSI-RSs, a specific one or ones of the interference measurement CSI-RSs in the group of interference measurement parameters may be activated through the DCI. In the case that each interference measurement CSI-RS corresponds to one or more interference signal characteristic parameters, a specific one or ones of the interference signal characteristic parameters corresponding to a specific interference measurement CSI-RS in the group of interference measurement parameters may be activated through the DCI. In another possible embodiment of the present disclosure, the DCI may also be used to indicate the terminal not to use any interference measurement parameter, i.e., no interference measurement parameter may be activated. In this case, the terminal may use the interference signal acquired by measuring the IMRs to measure and calculate the CSI. In addition, in the case that no IMR is configured by the network device, the terminal may use the acquired interference signal to measure and calculate the CSI.

To be specific, DCI bits may be used to indicate the interference measurement parameters, the interference measurement CSI-RSs and the interference signal characteristic parameters to be used by the terminal. A correspondence between values of the DCI bits and the interference measurement parameters to be used may be pre-agreed, or configured by the network device for the terminal through signaling. The implementations thereof have been described hereinbefore, and thus will not be particularly defined herein.

Apart from the DCI bits, a DCI bitmap may also be used to indicate the interference measurement parameters, the interference measurement CSI-RSs, and the interference signal characteristic parameters to be used by the terminal to perform the interference measurement and calculation.

Several modes for determining the interference measurement parameters, the interference measurement CSI-RSs and the interference signal characteristic parameters to be used by the terminal have been described hereinabove.

The network device may transmit indication information to the terminal. The indication information may be used to indicate one or more groups of interference measurement parameters to be used by the terminal, one or more interference measurement CSI-RSs in each group of interference measurement parameters, and one or more interference signal characteristic parameters corresponding to each interference measurement CSI-RS.

With respect to one or more interference measurement CSI-RSs corresponding to each interference source base station configured by the network device for the terminal, the network device may configure configuration information about the interference measurement CSI-RSs for the terminal. Each interference measurement CSI-RS is an interference measurement CSI-RS from one interference source base station. The configuration information about each interference measurement CSI-RS includes such parameters of the interference measurement CSI-RS as transmission period, subframe offset, sequence and power.

Each interference signal characteristic parameter corresponding to each interference measurement CSI-RS configured by the network device for the terminal may include a correlation matrix of a signal from the interference source base station, or a set of pre-coding matrices used by the interference source base station for the data transmission. A pre-coding matrix used by the terminal for the subsequent data transmission is selected from the set of pre-coding matrices.

In the case that each interference signal characteristic parameter includes the correlation matrix of the signal from the interference source base station, i.e., a covariance matrix, $R=E\{xx^H\}$, where R represents the correlation matrix of the signal, and x represents the signal from the interference source base station. In the case that the data to be transmitted is pre-processed by the interference source base station using the pre-coding matrix, $x=Ws$, where $s=[s_1, s_2, \ldots, s_K]$, s represents source data from the interference source base station, and W represents the pre-coding matrix for the transmission an interference signal. In the case that $E\{ss^H\}=a I$ (where I represents a unit matrix and a represents a scalar), $R=E\{xx^H\}=aWW^H$. For the network device, a spatial characteristic and/or strength of the signal from the interference source base station may be represented by the interference signal characteristic parameter, e.g., a direction or a strength of an interference signal from a neighboring cell.

In the case that each interference signal characteristic parameter includes a set of pre-coding matrices used by the interference source base station for the data transmission, the set of pre-coding matrices is $\{W_1, W_2, \ldots, W_P\}$. A PMI refers to an index of the pre-coding matrix, and it is directed to a predefined set of pre-coding matrices, i.e., a codebook. The PMIs correspond to elements in the codebook respectively. Hence, the set of pre-coding matrices may also be expressed as a set of PMIs, i.e., {PMI1, PMI2, ..., PIMP}. Optionally, with respect to each PMI in the set of PMIs, the base station may configure a weighting factor for it, so as to represent a probability of use of the PMI in the subsequent transmission, or transmission power corresponding to the PMI, or a ratio of the transmission power to total transmission power.

As mentioned above, the network device may configure the interference measurement parameters, or the interference measurement CSI-RS and the interference signal characteristic parameter as well as the correspondence therebetween, for the terminal. In addition, the above steps may be performed by the terminal prior to or subsequent to the interference measurement.

In the embodiments of the present disclosure, the terminal may perform the parameter configuration, and then perform the interference measurement, so as to acquire the initial interference measurement result.

In LTE Release 8 to LTE Release 10 systems, the terminal may perform the interference measurement on the basis of a conventional CRS or CSI-RS, so as to acquire the initial interference measurement result. In an LTE Release 11 system, the network device may configure for the terminal the dedicated IMR for the terminal, and then the terminal may perform the interference measurement on the IMR, so as to acquire the initial interference measurement result.

Optionally, in the case that there are coordination base stations for the terminal, the initial interference measurement result acquired by the terminal is interference from a base station other than a set of the coordination base stations. The interference source base stations corresponding to the interference measurement parameters configured by the network device are the coordination base stations for the terminal.

In another possible embodiment of the present disclosure, in the case that the terminal performs data transmission with another terminal based on single-cell, multiple-user Multiple-Input Multiple-Output (MIMO), the terminal may perform the interference measurement so as to acquire the interference from a base station other than a serving base station for the terminal as the initial interference measurement result. The other terminal is located within a serving cell identical to the terminal, and may occupy time-frequency resources identical to the terminal. The interference source base station corresponding to the interference measurement parameter configured by the network device is the serving base station for the terminal.

Upon the acquisition of the initial interference measurement result, the terminal may measure a channel matrix from the interference source base station corresponding to each interference measurement CSI-RS to the terminal.

To be specific, the terminal may measure interference channels from the interference source base station to the terminal based on the interference measurement CSI-RS. Optionally, in the case that a plurality of groups of interference measurement parameters has been configured for the terminal, the terminal may measure the interference channels from the interference source base station to the terminal based on each interference measurement CSI-RS in each set of interference measurement parameters, and further perform channel estimation, so as to acquire the channel matrix from the terminal to the interference source base station.

As mentioned above, in the embodiments of the present disclosure, the terminal may perform the interference measurement so as to acquire the initial interference measurement result, determine the CSI based on the initial interference measurement result and the interference measurement parameter configured by the network device, and report the determined CSI to the network device.

The interference measurement parameter is configured by the network device, so it may be used to reflect an actual situation of the interference information, and the interference information acquired by the terminal based on the interference measurement parameter may match the interference information during the actual transmission in a better manner. Upon the acquisition of the initial interference measurement result, the terminal may determine the CSI based on the initial interference measurement result and the interference information configured by the network device, and then report the determined CSI to the network device. As a result, it is able to increase a matching degree between the interference information measured by the terminal and the interference information during the actual transmission, thereby to enable the network device to select a more appropriate parameter for the link adaptation.

Figure 4:
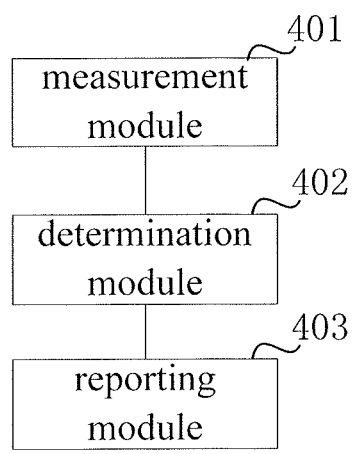
FIG. 4 is a schematic view showing a terminal in some embodiments of the present disclosure.

FIG. 4 is a schematic view showing a terminal in some embodiments of the present disclosure.

Based on an identical inventive concept, the present disclosure further provides in some embodiments a terminal, which as shown in FIG. 4, includes a measurement module 401, a determination module 402 and a reporting module 403. The measurement module 401 is configured to perform interference measurement so as to acquire initial interference measurement result. The determination module 402 is configured to determine CSI based on the initial interference measurement result and an interference measurement parameter configured by a network device. The reporting module 403 is configured to report the determined CSI to the network device.

The interference measurement parameter is configured by the network device, so it may be used to reflect an actual situation of the interference information, and the interference information acquired by the terminal based on the interference measurement parameter may match the interference information for the actual transmission in a better manner.

The determination module 402 of the terminal may determine the CSI in the following two modes.

Mode 1

The network device may configure the interference measurement parameters of an interference source base station for the terminal. Optionally, the interference measurement parameters may be grouped into one or more groups, and each group of interference measurement parameters may correspond to one interference source base station. Each group of interference measurement parameters may include one or more interference measurement CSI-RSs, and each interference measurement CSI-RS may correspond to one or more interference signal characteristic parameter. This interference measurement CSI-RS refers to a CSI-RS from one interference source base station.

Then, the determination module may determine the CSI based on the initial interference measurement result and the interference measurement parameter configured by the network device.

Mode 2

The network device may directly configure one or more interference measurement CSI-RSs, one or more interference signal characteristic parameters and a correspondence between each interference measurement CSI-RS and the one or more interference signal characteristic parameters. Optionally, the network device may also configure a correspondence between each interference measurement CSI-RS and an interference source base station. In this mode, each interference source base station may correspond to one or more interference measurement CSI-RSs, and each interference measurement CSI-RS may correspond to one or more interference signal characteristic parameter. This interference measurement CSI-RS refers to a CSI-RS from one interference source base station. At this time, the terminal may determine the CSI based on the initial interference measurement result, the interference measurement CSI-RS configured by the network device, and the interference signal characteristic parameter corresponding to the interference measurement CSI-RS.

The determination module may determine the CSI based on the initial interference measurement result, the interference measurement CSI-RS configured by the network device, and the interference signal characteristic parameter corresponding to the interference measurement CSI-RS.

In Mode 2, the one or more interference measurement CSI-RSs corresponding to each interference source base station and the one or more interference signal characteristic parameter corresponding to each CSI-RS may be considered as a group of interference measurement parameters in Mode 1. The following description will be given by taking Mode 1 as an example, and a person skilled in the art may, based on this correspondence, replace terms in the group of interference measurement parameters with the one or more interference measurement CSI-RSs corresponding to each interference source base station and the one or more interference signal characteristic parameters corresponding to each CSI-RS in Mode 2.

In the embodiments of the present disclosure, in the case that a plurality of groups of interference measurement parameters has been configured, the terminal may perform the interference measurement and calculation based on all the interference measurement parameters, or the interference measurement parameters, the interference measurement CSI-RSs and the interference signal characteristic parameters to be used by the terminal may be indicated through high-layer signaling or DCI.

Optionally, one or more of the followings may be indicated in the DCI: one or more groups of interference measurement parameters to be used by the terminal, one or more interference measurement CSI-RSs in each group of interference measurement parameters to be used by the terminal, and one or more interference signal characteristic parameters corresponding to each interference measurement CSI-RS to be used by the terminal. In other words, the DCI may be used to indicate the terminal to use which one or more groups of interference measurement parameters to perform the interference measurement and calculation, or which one or more groups of interference measurement parameters may be activated. In the case that each group of interference measurement parameters includes one or more interference measurement CSI-RSs, a specific one or ones of the interference measurement CSI-RSs in the group of interference measurement parameters may be activated through the DCI. In the case that each interference measurement CSI-RS corresponds to one or more interference signal characteristic parameters, a specific one or ones of the interference signal characteristic parameters corresponding to a specific interference measurement CSI-RS in the group of interference measurement parameters may be activated through the DCI. In another possible embodiment of the present disclosure, the DCI may also be used to indicate the terminal not to use any interference measurement parameter, i.e., no interference measurement parameter may be activated. In this case, the terminal may use the interference signal acquired by measuring the IMRs to measure and calculate the CSI. In addition, in the case that no IMR is configured by the network device, the terminal may use the acquired interference signal to measure and calculate the CSI.

To be specific, DCI bits may be used to indicate the interference measurement parameters, the interference measurement CSI-RSs and the interference signal characteristic parameters to be used by the terminal. A correspondence between values of the DCI bits and the interference measurement parameters to be used may be pre-agreed, or configured by the network device for the terminal through signaling. The implementations thereof have been described hereinbefore, and thus will not be particularly defined herein.

Apart from the DCI bits, a DCI bitmap may also be used to indicate the interference measurement parameters, the interference measurement CSI-RSs, and the interference signal characteristic parameters to be used by the terminal to perform the interference measurement and calculation.

Several modes for determining the interference measurement parameters, the interference measurement CSI-RSs and the interference signal characteristic parameters to be used by the terminal have been described hereinabove.

The terminal may receive indication information from the network device. The indication information may be used to indicate one or more groups of interference measurement parameters to be used by the terminal, one or more interference measurement CSI-RSs in each group of interference measurement parameters, and one or more interference signal characteristic parameters corresponding to each interference measurement CSI-RS.

With respect to one or more interference measurement CSI-RSs corresponding to each interference source base station configured by the network device for the terminal, the network device may configure configuration information about the interference measurement CSI-RSs for the terminal. Each interference measurement CSI-RS is an interference measurement CSI-RS from one interference source base station. The configuration information about each interference measurement CSI-RS includes such parameters of the interference measurement CSI-RS as transmission period, subframe offset, sequence and power.

Each interference signal characteristic parameter corresponding to each interference measurement CSI-RS configured by the network device for the terminal may include a correlation matrix of a signal from the interference source base station, or a set of pre-coding matrices used by the interference source base station for the data transmission. A pre-coding matrix used by the terminal for the subsequent data transmission is selected from the set of pre-coding matrices.

In the case that each interference signal characteristic parameter includes the correlation matrix of the signal from the interference source base station, i.e., a covariance matrix, $R=E\{xx^H\}$, where R represents the correlation matrix of the signal, and x represents the signal from the interference source base station. In the case that the data to be transmitted is pre-processed by the interference source base station using the pre-coding matrix, $x=Ws$, where $s=[s_1, s_2, \ldots, s_K]$, s represents source data from the interference source base station, and W represents the pre-coding matrix for the transmission an interference signal. In the case that $E\{ss^H\}=a\,I$ (where I represents a unit matrix and a represents a scalar), $R=E\{xx^H\}=aWW^H$. For the network device, a spatial characteristic and/or strength of the signal from the interference source base station may be represented by the interference signal characteristic parameter, e.g., a direction or a strength of an interference signal from a neighboring cell.

In the case that each interference signal characteristic parameter includes a set of pre-coding matrices used by the interference source base station for the data transmission, the set of pre-coding matrices is $\{W_1, W_2, \ldots, W_P\}$. A PMI refers to an index of the pre-coding matrix, and it is directed to a predefined set of pre-coding matrices, i.e., a codebook. The PMIs correspond to elements in the codebook respectively. Hence, the set of pre-coding matrices may also be expressed as a set of PMIs, i.e., $\{PMI1, PMI2, \ldots, PIMP\}$. Optionally, with respect to each PMI in the set of PMIs, the base station may configure a weighting factor for it, so as to represent a probability of use of the PMI in the subsequent transmission, or transmission power corresponding to the PMI, or a ratio of the transmission power to total transmission power.

As mentioned above, the network device may configure the interference measurement parameters, or the interference measurement CSI-RS and the interference signal characteristic parameter as well as the correspondence therebetween, for the terminal. In addition, the above steps may be performed by the terminal prior to or subsequent to the interference measurement.

In the embodiments of the present disclosure, the terminal may perform the parameter configuration, and then perform the interference measurement, so as to acquire the initial interference measurement result.

In LTE Release 8 to LTE Release 10 systems, the terminal may perform the interference measurement on the basis of a conventional CRS or CSI-RS, so as to acquire the initial interference measurement result. In an LTE Release 11 system, the network device may configure for the terminal the dedicated IMR for the terminal, and then the terminal may perform the interference measurement on the IMR, so as to acquire the initial interference measurement result.

Optionally, in the case that there are coordination base stations for the terminal, the initial interference measurement result acquired by the terminal is interference from a base station other than a set of the coordination base stations. The interference source base stations corresponding to the interference measurement parameters configured by the network device are the coordination base stations for the terminal.

In another possible embodiment of the present disclosure, in the case that the terminal performs data transmission with another terminal based on single-cell, multiple-user MIMO, the terminal may perform the interference measurement so as to acquire the interference from a base station other than a serving base station for the terminal as the initial interference measurement result. The other terminal is located within a serving cell identical to the terminal, and may occupy time-frequency resources identical to the terminal. The interference source base station corresponding to the interference measurement parameter configured by the network device is the serving base station for the terminal.

Upon the acquisition of the initial interference measurement result, the terminal may measure a channel matrix from the interference source base station corresponding to each interference measurement CSI-RS to the terminal.

To be specific, the terminal may measure interference channels from the interference source base station to the terminal based on the interference measurement CSI-RS. Optionally, in the case that a plurality of groups of interference measurement parameters has been configured for the terminal, the terminal may measure the interference channels from the interference source base station to the terminal based on each interference measurement CSI-RS in each group of interference measurement parameters, and further perform channel estimation, so as to acquire the channel matrix from the terminal to the interference source base station.

The terminal may determine the total interference based on the initial interference measurement result, the channel matrix and the interference signal characteristic parameter, and then determine the CSI based on the total interference. The total interference is a sum of a result acquired based on the channel matrix and the interference signal characteristic parameter and the initial interference measurement result.

The terminal may determine the total interference based on the initial interference measurement result, the channel matrix and the interference signal characteristic parameter using the above-mentioned formulae (1) to (17), which will not be particularly defined herein.

Upon the determination of the total interference as mentioned above, the terminal may determine the CSI based on the total interference, and report the determined CSI to the network device. In the embodiments of the present disclosure, the CSI includes information such as RI, CQI and PMI.

Apart from the above, some other implementation modes may also be provided.

In one implementation mode, upon the acquisition of the initial interference measurement result, the terminal may determine the CSI based on the initial interference measurement result, adjust the determined CSI based on the interference measurement parameter configured by the network device, and then report the adjusted CSI to the network device. In this implementation mode, the adjustment of the determined CSI based on the interference measurement parameter configured by the network device may be pre-determined, e.g., the CQI in the preliminarily-determined CSI may be increased or reduced based on the interference measurement parameter.

In another implementation mode, a mapping table between the CSI and the initial interference measurement result, the interference measurement CSI-RS in the interference measurement parameter as well as the interference signal characteristic parameter may be established, then the CSI may be looked up in the mapping table based on the initial interference measurement result, the interference measurement CSI-RS and the interference signal characteristic parameter, and then the determined CSI information may be reported to the network device.

During the implementation, a CSI progress is a concept introduced into an LTE Release 11 system. One CSI progress corresponds to a CSI for the transmission hypothesis. The transmission hypothesis includes a signal hypothesis and an interference hypothesis, so one CSI process is associated with one CSI-RS and one IMR. The signal hypothesis is acquired by measuring the CSI-RS, and the interference hypothesis is acquired by measuring the IMR. According to the method in the embodiments of the present disclosure, the definition of one CSI progress may be modified as being associated with one CSI-RS and one IMR, and being associated with one or more groups of interference measurement parameters. The CSI measurement and calculation for the CSI progress may be completed using the above-mentioned methods.

As mentioned above, in the embodiments of the present disclosure, the terminal may perform the interference measurement so as to acquire the initial interference measurement result, determine the CSI based on the initial interference measurement result and the interference measurement parameter configured by the network device, and report the determined CSI to the network device.

The interference measurement parameter is configured by the network device, so it may be used to reflect an actual situation of the interference information, and the interference information acquired by the terminal based on the interference measurement parameter may match the interference information for the actual transmission in a better manner. Upon the acquisition of the initial interference measurement result, the terminal may determine the CSI based on the initial interference measurement result and the interference information configured by the network device, and then report the determined CSI to the network device. As a result, it is able to increase a matching degree between the interference information measured by the terminal and the interference information for the actual transmission, thereby to enable the network device to select a more appropriate parameter for the link adaptation.

Figure 5:
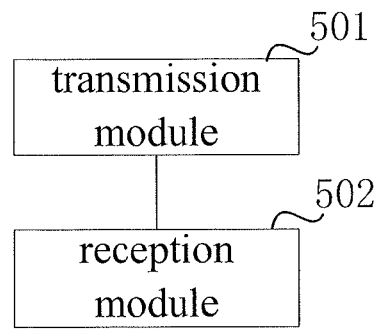
FIG. 5 is a schematic view showing a network device in some embodiments of the present disclosure.

FIG. 5 is a schematic view showing a network device in some embodiments of the present disclosure.

Based on an identical inventive concept, the present disclosure further provides in some embodiments a network device which, as shown in FIG. 5, includes a transmission mode 501 and a reception module 502. The transmission module 501 is configured to transmit configuration information to a terminal, and the configuration information includes an interference measurement parameter. The reception module 502 is configured to receive CSI reported by the terminal, and the CSI is determined by the terminal based on initial interference measurement result and the interference measurement parameter configured by the network device and then reported to the network device.

The interference measurement parameter is configured by the network device, so it may be used to reflect an actual situation of the interference information, and the interference information acquired by the terminal based on the interference measurement parameter may match the interference information for the actual transmission in a better manner.

The transmission module 501 of the network device may transmit the configuration information to the terminal in the following two modes.

Mode 1

The configuration information transmitted by the network device to the terminal may include the interference measurement parameters. Optionally, the interference measurement parameters may be grouped into one or more groups, and each group of interference measurement parameters may correspond to one interference source base station. Each group of interference measurement parameters includes one or more interference measurement CSI-RSs, and each interference measurement CSI-RS corresponds to one or more interference signal characteristic parameters. The interference measurement CSI-RS refers to a CSI-RS from one interference source base station.

The network device may receive the CSI reported by the terminal. The CSI may be determined by the terminal based on the initial interference measurement result and the interference measurement parameter configured by the network device and then reported to the network device.

Mode 2

The configuration information transmitted by the network device may merely include one or more interference measurement CSI-RSs, one or more interference signal characteristic parameters and a correspondence between each interference measurement CSI-RS and the one or more interference signal characteristic parameters. Optionally, the configuration information may further include a correspondence between each interference measurement CSI-RS and an interference source base station. In this mode, each interference source base station may correspond to one or more interference measurement CSI-RSs, and each interference measurement CSI-RS may correspond to one or more interference signal characteristic parameters. The Interference measurement CSI-RS refers to a CSI-RS from one interference source base station. At this time, the terminal may determine the CSI based on the initial interference measurement result, the interference measurement CSI-RS configured by the network device and the interference signal characteristic parameter corresponding to the interference measurement CSI-RS.

The network device may receive the CSI reported by the terminal. The CSI may be determined by the terminal based on the initial interference measurement result and the interference measurement parameter configured by the network device and then reported to the network device.

In Mode 2, the one or more interference measurement CSI-RSs corresponding to each interference source base station and the one or more interference signal characteristic parameters corresponding to each CSI-RS may be considered as a group of interference measurement parameters in Mode 1. The following description will be given by taking Mode 1 as an example, and a person skilled in the art may, based on this correspondence, replace terms in the group of interference measurement parameters with the one or more interference measurement CSI-RSs corresponding to each interference source base station and the one or more interference signal characteristic parameters corresponding to each CSI-RS in Mode 2.

In the embodiments of the present disclosure, in the case that a plurality of groups of interference measurement parameters has been configured, the terminal may perform the interference measurement and calculation based on all the interference measurement parameters, or the interference measurement parameters, the interference measurement CSI-RSs and the interference signal characteristic parameters to be used by the terminal may be indicated through high-layer signaling or DCI.

Optionally, one or more of the followings may be indicated in the DCI: one or more groups of interference measurement parameters to be used by the terminal, one or more interference measurement CSI-RSs in each group of interference measurement parameters to be used by the terminal, and one or more interference signal characteristic parameters corresponding to each interference measurement CSI-RS to be used by the terminal. In other words, the DCI may be used to indicate the terminal to use which one or more groups of interference measurement parameters to perform the interference measurement and calculation, or which one or more groups of interference measurement parameters may be activated. In the case that each group of interference measurement parameters includes one or more interference measurement CSI-RSs, a specific one or ones of the interference measurement CSI-RSs in the group of interference measurement parameters may be activated through the DCI. In the case that each interference measurement CSI-RS corresponds to one or more interference signal characteristic parameters, a specific one or ones of the interference signal characteristic parameters corresponding to a specific interference measurement CSI-RS in the group of interference measurement parameters may be activated through the DCI. In another possible embodiment of the present disclosure, the DCI may also be used to indicate the terminal not to use any interference measurement parameter, i.e., no interference measurement parameter may be activated. In this case, the terminal may use the interference signal acquired by measuring the IMRs to measure and calculate the CSI. In addition, in the case that no IMR is configured by the network device, the terminal may use the acquired interference signal to measure and calculate the CSI.

To be specific, DCI bits may be used to indicate the interference measurement parameters, the interference measurement CSI-RSs and the interference signal characteristic parameters to be used by the terminal. A correspondence between values of the DCI bits and the interference measurement parameters to be used may be pre-agreed, or configured by the network device for the terminal through signaling. The implementations thereof have been described hereinbefore, and thus will not be particularly defined herein.

Apart from the DCI bits, a DCI bitmap may also be used to indicate the interference measurement parameters, the interference measurement CSI-RSs, and the interference signal characteristic parameters to be used by the terminal to perform the interference measurement and calculation.

Several modes for determining the interference measurement parameters, the interference measurement CSI-RSs and the interference signal characteristic parameters to be used by the terminal have been described hereinabove.

The network device may transmit indication information to the terminal. The indication information may be used to indicate one or more groups of interference measurement parameters to be used by the terminal, one or more interference measurement CSI-RSs in each group of interference measurement parameters, and one or more interference signal characteristic parameters corresponding to each interference measurement CSI-RS.

With respect to one or more interference measurement CSI-RSs corresponding to each interference source base station configured by the network device for the terminal, the network device may configure configuration information about the interference measurement CSI-RSs for the terminal. Each interference measurement CSI-RS is an interference measurement CSI-RS from one interference source base station. The configuration information about each interference measurement CSI-RS includes such parameters of the interference measurement CSI-RS as transmission period, subframe offset, sequence and power.

Each interference signal characteristic parameter corresponding to each interference measurement CSI-RS configured by the network device for the terminal may include a correlation matrix of a signal from the interference source base station, or a set of pre-coding matrices used by the interference source base station for the data transmission. A pre-coding matrix used by the terminal for the subsequent data transmission is selected from the set of pre-coding matrices.

In the case that each interference signal characteristic parameter includes the correlation matrix of the signal from the interference source base station, i.e., a covariance matrix, $R=E\{xx^H\}$, where R represents the correlation matrix of the signal, and x represents the signal from the interference source base station. In the case that the data to be transmitted is pre-processed by the interference source base station using the pre-coding matrix, $x=Ws$, where $s=[s_1, s_2, \ldots, s_K]$, s represents source data from the interference source base station, and W represents the pre-coding matrix for the transmission an interference signal. In the case that $E\{ss^H\}=a\,I$ (where I represents a unit matrix and a represents a scalar), $R=E\{xx^H\}=aWW^H$. For the network device, a spatial characteristic and/or strength of the signal from the interference source base station may be represented by the interference signal characteristic parameter, e.g., a direction or a strength of an interference signal from a neighboring cell.

In the case that each interference signal characteristic parameter includes a set of pre-coding matrices used by the interference source base station for the data transmission, the set of pre-coding matrices is $\{W_1, W_2, \ldots, W_P\}$. A PMI refers to an index of the pre-coding matrix, and it is directed to a predefined set of pre-coding matrices, i.e., a codebook. The PMIs correspond to elements in the codebook respectively. Hence, the set of pre-coding matrices may also be expressed as a set of PMIs, i.e., $\{PMI1, PMI2, \ldots, PIMP\}$.

Optionally, with respect to each PMI in the set of PMIs, the base station may configure a weighting factor for it, so as to represent a probability of use of the PMI in the subsequent transmission, or transmission power corresponding to the PMI, or a ratio of the transmission power to total transmission power.

As mentioned above, the network device may configure the interference measurement parameters, or the interference measurement CSI-RS and the interference signal characteristic parameter as well as the correspondence therebetween, for the terminal. In addition, the above steps may be performed by the terminal prior to or subsequent to the interference measurement.

In the embodiments of the present disclosure, the terminal may perform the parameter configuration, and then perform the interference measurement, so as to acquire the initial interference measurement result.

In LTE Release 8 to LTE Release 10 systems, the terminal may perform the interference measurement on the basis of a conventional CRS or CSI-RS, so as to acquire the initial interference measurement result. In an LTE Release 11 system, the network device may configure for the terminal the dedicated IMR for the terminal, and then the terminal may perform the interference measurement on the IMR, so as to acquire the initial interference measurement result.

Optionally, in the case that there are coordination base stations for the terminal, the initial interference measurement result acquired by the terminal is interference from a base station other than a set of the coordination base stations. The interference source base stations corresponding to the interference measurement parameters configured by the network device are the coordination base stations for the terminal.

In another possible embodiment of the present disclosure, in the case that the terminal performs data transmission with another terminal based on single-cell, multiple-user Multiple-Input Multiple-Output (MIMO), the terminal may perform the interference measurement so as to acquire the interference from a base station other than a serving base station for the terminal as the initial interference measurement result. The other terminal is located within a serving cell identical to the terminal, and may occupy time-frequency resources identical to the terminal. The interference source base station corresponding to the interference measurement parameter configured by the network device is the serving base station for the terminal.

Upon the acquisition of the initial interference measurement result, the terminal may measure a channel matrix from the interference source base station corresponding to each interference measurement CSI-RS to the terminal.

To be specific, the terminal may measure interference channels from the interference source base station to the terminal based on the interference measurement CSI-RS. Optionally, in the case that a plurality of groups of interference measurement parameters has been configured for the terminal, the terminal may measure the interference channels from the interference source base station to the terminal based on each interference measurement CSI-RS in each set of interference measurement parameters, and further perform channel estimation, so as to acquire the channel matrix from the terminal to the interference source base station.

As mentioned above, in the embodiments of the present disclosure, the terminal may perform the interference measurement so as to acquire the initial interference measurement result, determine the CSI based on the initial interference measurement result and the interference measurement parameter configured by the network device, and report the determined CSI to the network device.

The interference measurement parameter is configured by the network device, so it may be used to reflect an actual situation of the interference information, and the interference information acquired by the terminal based on the interference measurement parameter may match the interference information during the actual transmission in a better manner. Upon the acquisition of the initial interference measurement result, the terminal may determine the CSI based on the initial interference measurement result and the interference information configured by the network device, and then report the determined CSI to the network device. As a result, it is able to increase a matching degree between the interference information measured by the terminal and the interference information during the actual transmission, thereby to enable the network device to select a more appropriate parameter for the link adaptation.

Figure 6:
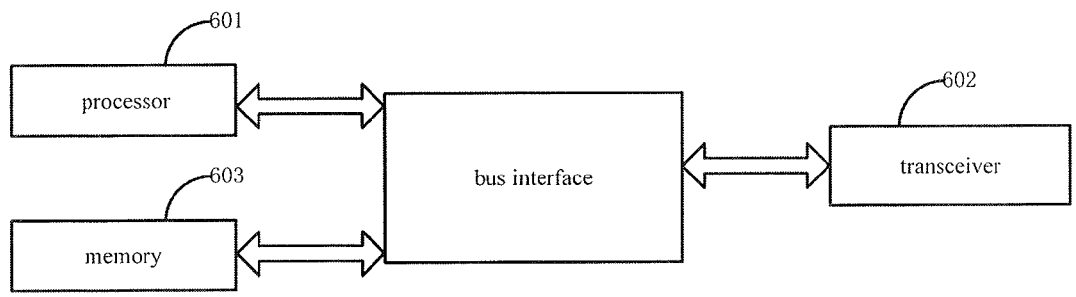
FIG. 6 is another schematic view showing the terminal in some embodiments of the present disclosure.

FIG. 6 is another schematic view showing the terminal in some embodiments of the present disclosure.

Based on an identical inventive concept, the present disclosure further provides in some embodiments a terminal which, as shown in FIG. 6, includes a memory 601, a transceiver 602 and a memory 603. The processor 601 is configured to read a program stored in the memory 603, so as to: perform interference measurement to acquire initial interference measurement result; and determine CSI based on the initial interference measurement result and an interference measurement parameter configured by a network device. The transceiver 602 is configured to receive and transmit data under the control of the processor 601, e.g., report the determined CSI to the network device.

In FIG. 6, bus architecture may include a number of buses and bridges connected to each other, so as to connect various circuits for one or more processors 601 and one or more memories 603. In addition, as is known in the art, the bus architecture may be used to connect any other circuits, such as a circuit for a peripheral device, a circuit for a voltage stabilizer and a power management circuit. Bus interfaces are provided, and the transceiver 602 may consist of a plurality of elements, i.e., a transmitter and a receiver for communication with any other devices over a transmission medium. The processor 601 may take charge of managing the bus architecture as well as general processings. The memory 603 may store data for the operation of the processor 601.

The processor 601 of the terminal may determine the CSI in the following two modes.

Mode 1

The network device may configure the interference measurement parameters of an interference source base station for the terminal. Optionally, the interference measurement parameters may be grouped into one or more groups, and each group of interference measurement parameters may correspond to one interference source base station. Each group of interference measurement parameters may include one or more interference measurement CSI-RSs, and each interference measurement CSI-RS may correspond to one or more interference signal characteristic parameter. This interference measurement CSI-RS refers to a CSI-RS from one interference source base station.

The processor 601 of the terminal may then determine the CSI based on the initial interference measurement result and the interference measurement parameter configured by the network device.

Mode 2

The network device may directly configure one or more interference measurement CSI-RSs, one or more interference signal characteristic parameters and a correspondence between each interference measurement CSI-RS and the one or more interference signal characteristic parameters. Optionally, the network device may also configure a correspondence between each interference measurement CSI-RS and an interference source base station. In this mode, each interference source base station may correspond to one or more interference measurement CSI-RSs, and each interference measurement CSI-RS may correspond to one or more interference signal characteristic parameter. This interference measurement CSI-RS refers to a CSI-RS from one interference source base station. At this time, the terminal may determine the CSI based on the initial interference measurement result, the interference measurement CSI-RS configured by the network device, and the interference signal characteristic parameter corresponding to the interference measurement CSI-RS.

The processor 601 of the terminal may then determine the CSI based on the initial interference measurement result, the interference measurement CSI-RS configured by the network device, and the interference signal characteristic parameter corresponding to the interference measurement CSI-RS.

In Mode 2, the one or more interference measurement CSI-RSs corresponding to each interference source base station and the one or more interference signal characteristic parameter corresponding to each CSI-RS may be considered as a group of interference measurement parameters in Mode 1. The following description will be given by taking Mode 1 as an example, and a person skilled in the art may, based on this correspondence, replace terms in the group of interference measurement parameters with the one or more interference measurement CSI-RSs corresponding to each interference source base station and the one or more interference signal characteristic parameters corresponding to each CSI-RS in Mode 2.

In the embodiments of the present disclosure, in the case that a plurality of groups of interference measurement parameters has been configured, the terminal may perform the interference measurement and calculation based on all the interference measurement parameters, or the interference measurement parameters, the interference measurement CSI-RSs and the interference signal characteristic parameters to be used by the terminal may be indicated through high-layer signaling or DCI.

Optionally, one or more of the followings may be indicated in the DCI: one or more groups of interference measurement parameters to be used by the terminal, one or more interference measurement CSI-RSs in each group of interference measurement parameters to be used by the terminal, and one or more interference signal characteristic parameters corresponding to each interference measurement CSI-RS to be used by the terminal. In other words, the DCI may be used to indicate the terminal to use which one or more groups of interference measurement parameters to perform the interference measurement and calculation, or which one or more groups of interference measurement parameters may be activated. In the case that each set of interference measurement parameters includes one or more interference measurement CSI-RSs, a specific one or ones of the interference measurement CSI-RSs in the group of interference measurement parameters may be activated through the DCI. In the case that each interference measurement CSI-RS corresponds to one or more interference signal characteristic parameters, a specific one or ones of the interference signal characteristic parameters corresponding to a specific interference measurement CSI-RS in the set of interference measurement parameters may be activated through the DCI. In another possible embodiment of the present disclosure, the DCI may also be used to indicate the terminal not to use any interference measurement parameter, i.e., no interference measurement parameter may be activated. In this case, the terminal may use the interference signal acquired by measuring the IMRs to measure and calculate the CSI. In addition, in the case that no IMR is configured by the network device, the terminal may use the acquired interference signal to measure and calculate the CSI.

To be specific, DCI bits may be used to indicate the interference measurement parameters, the interference measurement CSI-RSs and the interference signal characteristic parameters to be used by the terminal. A correspondence between values of the DCI bits and the interference measurement parameters to be used may be pre-agreed, or configured by the network device for the terminal through signaling. The implementations thereof have been described hereinbefore, and thus will not be particularly defined herein.

Apart from the DCI bits, a DCI bitmap may also be used to indicate the interference measurement parameters, the interference measurement CSI-RSs, and the interference signal characteristic parameters to be used by the terminal to perform the interference measurement and calculation.

Several modes for determining the interference measurement parameters, the interference measurement CSI-RSs and the interference signal characteristic parameters to be used by the terminal have been described hereinabove.

The terminal may receive indication information from the network device. The indication information may be used to indicate one or more groups of interference measurement parameters to be used by the terminal, one or more interference measurement CSI-RSs in each group of interference measurement parameters, and one or more interference signal characteristic parameters corresponding to each interference measurement CSI-RS.

With respect to one or more interference measurement CSI-RSs corresponding to each interference source base station configured by the network device for the terminal, the network device may configure configuration information about the interference measurement CSI-RSs for the terminal. Each interference measurement CSI-RS is an interference measurement CSI-RS from one interference source base station. The configuration information about each interference measurement CSI-RS includes such parameters of the interference measurement CSI-RS as transmission period, subframe offset, sequence and power.

Each interference signal characteristic parameter corresponding to each interference measurement CSI-RS configured by the network device for the terminal may include a correlation matrix of a signal from the interference source base station, or a set of pre-coding matrices used by the interference source base station for the data transmission. A pre-coding matrix used by the terminal for the subsequent data transmission is selected from the set of pre-coding matrices.

In the case that each interference signal characteristic parameter includes the correlation matrix of the signal from the interference source base station, i.e., a covariance matrix, $R=E\{xx^H\}$, where R represents the correlation matrix of the signal, and x represents the signal from the interference source base station. In the case that the data to be transmitted is pre-processed by the interference source base station using the pre-coding matrix, $x=Ws$, where $s=[s_1, s_2, \ldots, s_K]$, s represents source data from the interference source base station, and W represents the pre-coding matrix for the transmission an interference signal. In the case that $E\{ss^H\}=a\,I$ (where I represents a unit matrix and a represents a scalar), $R=E\{xx^H\}=aWW^H$. For the network device, a spatial characteristic and/or strength of the signal from the interference source base station may be represented by the interference signal characteristic parameter, e.g., a direction or a strength of an interference signal from a neighboring cell.

In the case that each interference signal characteristic parameter includes a set of pre-coding matrices used by the interference source base station for the data transmission, the set of pre-coding matrices is $\{W_1, W_2, \ldots, W_P\}$. A PMI refers to an index of the pre-coding matrix, and it is directed to a predefined set of pre-coding matrices, i.e., a codebook. The PMIs correspond to elements in the codebook respectively. Hence, the set of pre-coding matrices may also be expressed as a set of PMIs, i.e., $\{PMI1, PMI2, \ldots, PIMP\}$. Optionally, with respect to each PMI in the set of PMIs, the base station may configure a weighting factor for it, so as to represent a probability of use of the PMI in the subsequent transmission, or transmission power corresponding to the PMI, or a ratio of the transmission power to total transmission power.

As mentioned above, the network device may configure the interference measurement parameters, or the interference measurement CSI-RS and the interference signal characteristic parameter as well as the correspondence therebetween, for the terminal. In addition, the above steps may be performed by the terminal prior to or subsequent to the interference measurement.

In the embodiments of the present disclosure, the terminal may perform the parameter configuration, and then perform the interference measurement, so as to acquire the initial interference measurement result.

In LTE Release 8 to LTE Release 10 systems, the terminal may perform the interference measurement on the basis of a conventional CRS or CSI-RS, so as to acquire the initial interference measurement result. In an LTE Release 11 system, the network device may configure for the terminal the dedicated IMR for the terminal, and then the terminal may perform the interference measurement on the IMR, so as to acquire the initial interference measurement result.

Optionally, in the case that there are coordination base stations for the terminal, the initial interference measurement result acquired by the terminal is interference from a base station other than a set of the coordination base stations. The interference source base stations corresponding to the interference measurement parameters configured by the network device are the coordination base stations for the terminal.

In another possible embodiment of the present disclosure, in the case that the terminal performs data transmission with another terminal based on single-cell, multiple-user MIMO, the terminal may perform the interference measurement so as to acquire the interference from a base station other than a serving base station for the terminal as the initial interference measurement result. The other terminal is located within a serving cell identical to the terminal, and may occupy time-frequency resources identical to the terminal. The interference source base station corresponding to the interference measurement parameter configured by the network device is the serving base station for the terminal.

Upon the acquisition of the initial interference measurement result, the terminal may measure a channel matrix from the interference source base station corresponding to each interference measurement CSI-RS to the terminal.

To be specific, the terminal may measure interference channels from the interference source base station to the terminal based on the interference measurement CSI-RS. Optionally, in the case that a plurality of groups of interference measurement parameters has been configured for the terminal, the terminal may measure the interference channels from the interference source base station to the terminal based on each interference measurement CSI-RS in each group of interference measurement parameters, and further perform channel estimation, so as to acquire the channel matrix from the terminal to the interference source base station.

The terminal may determine the total interference based on the initial interference measurement result, the channel matrix and the interference signal characteristic parameter, and then determine the CSI based on the total interference. The total interference is a sum of a result acquired based on the channel matrix and the interference signal characteristic parameter and the initial interference measurement result.

The terminal may determine the total interference based on the initial interference measurement result, the channel matrix and the interference signal characteristic parameter using the above-mentioned formulae (1) to (17), which will not be particularly defined herein.

Upon the determination of the total interference as mentioned above, the terminal may determine the CSI based on the total interference, and report the determined CSI to the network device. In the embodiments of the present disclosure, the CSI includes information such as RI, CQI and PMI.

Apart from the above, some other implementation modes may also be provided.

In one implementation mode, upon the acquisition of the initial interference measurement result, the terminal may determine the CSI based on the initial interference measurement result, adjust the determined CSI based on the interference measurement parameter configured by the network device, and then report the adjusted CSI to the network device. In this implementation mode, the adjustment of the determined CSI based on the interference measurement parameter configured by the network device may be pre-determined, e.g., the CQI in the preliminarily-determined CSI may be increased or reduced based on the interference measurement parameter.

In another implementation mode, a mapping table between the CSI and the initial interference measurement result, the interference measurement CSI-RS in the interference measurement parameter as well as the interference signal characteristic parameter may be established, then the CSI may be looked up in the mapping table based on the initial interference measurement result, the interference measurement CSI-RS and the interference signal characteristic parameter, and then the determined CSI information may be reported to the network device.

During the implementation, a CSI progress is a concept introduced into an LTE Release 11 system. One CSI progress corresponds to a CSI for the transmission hypothesis. The transmission hypothesis includes a signal hypothesis and an interference hypothesis, so one CSI process is associated with one CSI-RS and one IMR. The signal hypothesis is acquired by measuring the CSI-RS, and the interference hypothesis is acquired by measuring the IMR. According to the method in the embodiments of the present disclosure, the definition of one CSI progress may be modified as being associated with one CSI-RS and one IMR, and being associated with one or more groups of interference measurement parameters. The CSI measurement and calculation for the CSI progress may be completed using the above-mentioned methods.

As mentioned above, in the embodiments of the present disclosure, the terminal may perform the interference measurement so as to acquire the initial interference measurement result, determine the CSI based on the initial interference measurement result and the interference measurement parameter configured by the network device, and report the determined CSI to the network device.

The interference measurement parameter is configured by the network device, so it may be used to reflect an actual situation of the interference information, and the interference information acquired by the terminal based on the interference measurement parameter may match the interference information for the actual transmission in a better manner. Upon the acquisition of the initial interference measurement result, the terminal may determine the CSI based on the initial interference measurement result and the interference information configured by the network device, and then report the determined CSI to the network device. As a result, it is able to increase a matching degree between the interference information measured by the terminal and the interference information for the actual transmission, thereby to enable the network device to select a more appropriate parameter for the link adaptation.

Figure 7:
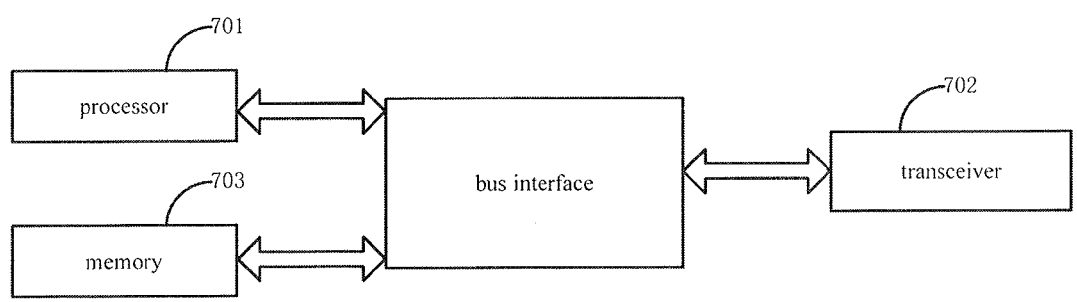
FIG. 7 is another schematic view showing the network device in some embodiments of the present disclosure.

FIG. 7 is another schematic view showing the network device in some embodiments of the present disclosure.

Based on an identical inventive concept, the present disclosure further provides in some embodiments a network device which, as shown in FIG. 7, includes a processor 701, a transceiver 702 and a memory 703. The processor 701 is configured to read a program stored in the memory 703, so as to: transmit through the transceiver 702 configuration information to a terminal, the configuration information including an interference measurement parameter; and receive through the transceiver 702 CSI reported by the terminal. The CSI is determined by the terminal based on initial interference measurement result and the interference measurement parameter configured by the network device and then reported to the network device. The transceiver 702 is configured to receive and transmit data under the control of the processor 701.

In FIG. 7, bus architecture may include a number of buses and bridges connected to each other, so as to connect various circuits for one or more processors 701 and one or more memories 703. In addition, as is known in the art, the bus architecture may be used to connect any other circuits, such as a circuit for a peripheral device, a circuit for a voltage stabilizer and a power management circuit. Bus interfaces are provided, and the transceiver 702 may consist of a plurality of elements, i.e., a transmitter and a receiver for communication with any other devices over a transmission medium. The processor 701 may take charge of managing the bus architecture as well as general processings. The memory 703 may store therein data for the operation of the processor 701.

The configuration information may be transmitted by the network device to the terminal through the transceiver 702 in the following two modes.

Mode 1

The configuration information transmitted by the network device to the terminal may include the interference measurement parameters. Optionally, the interference measurement parameters may be grouped into one or more groups, and each group of interference measurement parameters may correspond to one interference source base station. Each group of interference measurement parameters includes one or more interference measurement CSI-RSs, and each interference measurement CSI-RS corresponds to one or more interference signal characteristic parameters. The interference measurement CSI-RS refers to a CSI-RS from one interference source base station.

The network device may receive the CSI reported by the terminal. The CSI may be determined by the terminal based on the initial interference measurement result and the interference measurement parameter configured by the network device and then reported to the network device.

Mode 2

The configuration information transmitted by the network device may merely include one or more interference measurement CSI-RSs, one or more interference signal characteristic parameters and a correspondence between each interference measurement CSI-RS and the one or more interference signal characteristic parameters. Optionally, the configuration information may further include a correspondence between each interference measurement CSI-RS and an interference source base station. In this mode, each interference source base station may correspond to one or more interference measurement CSI-RSs, and each interference measurement CSI-RS may correspond to one or more interference signal characteristic parameters. The Interference measurement CSI-RS refers to a CSI-RS from one interference source base station. At this time, the terminal may determine the CSI based on the initial interference measurement result, the interference measurement CSI-RS configured by the network device and the interference signal characteristic parameter corresponding to the interference measurement CSI-RS.

The network device may receive the CSI reported by the terminal. The CSI may be determined by the terminal based on the initial interference measurement result and the interference measurement parameter configured by the network device and then reported to the network device.

In Mode 2, the one or more interference measurement CSI-RSs corresponding to each interference source base station and the one or more interference signal characteristic parameters corresponding to each CSI-RS may be considered as a group of interference measurement parameters in Mode 1. The following description will be given by taking Mode 1 as an example, and a person skilled in the art may, based on this correspondence, replace terms in the group of interference measurement parameters with the one or more interference measurement CSI-RSs corresponding to each interference source base station and the one or more interference signal characteristic parameters corresponding to each CSI-RS in Mode 2.

In the embodiments of the present disclosure, in the case that a plurality of groups of interference measurement parameters has been configured, the terminal may perform the interference measurement and calculation based on all the interference measurement parameters, or the interference measurement parameters, the interference measurement CSI-RSs and the interference signal characteristic parameters to be used by the terminal may be indicated through high-layer signaling or DCI.

Optionally, one or more of the followings may be indicated in the DCI: one or more groups of interference measurement parameters to be used by the terminal, one or more interference measurement CSI-RSs in each group of interference measurement parameters to be used by the terminal, and one or more interference signal characteristic parameters corresponding to each interference measurement CSI-RS to be used by the terminal. In other words, the DCI may be used to indicate the terminal to use which one or more groups of interference measurement parameters to perform the interference measurement and calculation, or which one or more groups of interference measurement parameters may be activated. In the case that each group of interference measurement parameters includes one or more interference measurement CSI-RSs, a specific one or ones of the interference measurement CSI-RSs in the set of interference measurement parameters may be activated through the DCI. In the case that each interference measurement CSI-RS corresponds to one or more interference signal characteristic parameters, a specific one or ones of the interference signal characteristic parameters corresponding to a specific interference measurement CSI-RS in the group of interference measurement parameters may be activated through the DCI. In another possible embodiment of the present disclosure, the DCI may also be used to indicate the terminal not to use any interference measurement parameter, i.e., no interference measurement parameter may be activated. In this case, the terminal may use the interference signal acquired by measuring the IMRs to measure and calculate the CSI. In addition, in the case that no IMR is configured by the network device, the terminal may use the acquired interference signal to measure and calculate the CSI.

To be specific, DCI bits may be used to indicate the interference measurement parameters, the interference measurement CSI-RSs and the interference signal characteristic parameters to be used by the terminal. A correspondence between values of the DCI bits and the interference measurement parameters to be used may be pre-agreed, or configured by the network device for the terminal through signaling. The implementations thereof have been described hereinbefore, and thus will not be particularly defined herein.

Apart from the DCI bits, a DCI bitmap may also be used to indicate the interference measurement parameters, the interference measurement CSI-RSs, and the interference signal characteristic parameters to be used by the terminal to perform the interference measurement and calculation.

Several modes for determining the interference measurement parameters, the interference measurement CSI-RSs and the interference signal characteristic parameters to be used by the terminal have been described hereinabove.

The network device may transmit indication information to the terminal. The indication information may be used to indicate one or more groups of interference measurement parameters to be used by the terminal, one or more interference measurement CSI-RSs in each group of interference measurement parameters, and one or more interference signal characteristic parameters corresponding to each interference measurement CSI-RS.

With respect to one or more interference measurement CSI-RSs corresponding to each interference source base station configured by the network device for the terminal, the network device may configure configuration information about the interference measurement CSI-RSs for the terminal. Each interference measurement CSI-RS is an interference measurement CSI-RS from one interference source base station. The configuration information about each interference measurement CSI-RS includes such parameters of the interference measurement CSI-RS as transmission period, subframe offset, sequence and power.

Each interference signal characteristic parameter corresponding to each interference measurement CSI-RS configured by the network device for the terminal may include a correlation matrix of a signal from the interference source base station, or a set of pre-coding matrices used by the interference source base station for the data transmission. A pre-coding matrix used by the terminal for the subsequent data transmission is selected from the set of pre-coding matrices.

In the case that each interference signal characteristic parameter includes the correlation matrix of the signal from the interference source base station, i.e., a covariance matrix, $R=E\{xx^H\}$, where R represents the correlation matrix of the signal, and x represents the signal from the interference source base station. In the case that the data to be transmitted is pre-processed by the interference source base station using the pre-coding matrix, $x=Ws$, where $s=[s_1, s_2, \ldots, s_K]$, s represents source data from the interference source base station, and W represents the pre-coding matrix for the transmission an interference signal. In the case that $E\{ss^H\}=a\,I$ (where I represents a unit matrix and a represents a scalar), $R=E\{xx^H\}=aWW^H$. For the network device, a spatial characteristic and/or strength of the signal from the interference source base station may be represented by the interference signal characteristic parameter, e.g., a direction or a strength of an interference signal from a neighboring cell.

In the case that each interference signal characteristic parameter includes a set of pre-coding matrices used by the interference source base station for the data transmission, the set of pre-coding matrices is $\{W_1, W_2, \ldots, W_P\}$. A PMI refers to an index of the pre-coding matrix, and it is directed to a predefined set of pre-coding matrices, i.e., a codebook. The PMIs correspond to elements in the codebook respectively. Hence, the set of pre-coding matrices may also be expressed as a set of PMIs, i.e., $\{PMI1, PMI2, \ldots, PIMP\}$. Optionally, with respect to each PMI in the set of PMIs, the base station may configure a weighting factor for it, so as to represent a probability of use of the PMI in the subsequent transmission, or transmission power corresponding to the PMI, or a ratio of the transmission power to total transmission power.

As mentioned above, the network device may configure the interference measurement parameters, or the interference measurement CSI-RS and the interference signal characteristic parameter as well as the correspondence therebetween, for the terminal. In addition, the above steps may be performed by the terminal prior to or subsequent to the interference measurement.

In the embodiments of the present disclosure, the terminal may perform the parameter configuration, and then perform the interference measurement, so as to acquire the initial interference measurement result.

In LTE Release 8 to LTE Release 10 systems, the terminal may perform the interference measurement on the basis of a conventional CRS or CSI-RS, so as to acquire the initial interference measurement result. In an LTE Release 11 system, the network device may configure for the terminal the dedicated IMR for the terminal, and then the terminal may perform the interference measurement on the IMR, so as to acquire the initial interference measurement result.

Optionally, in the case that there are coordination base stations for the terminal, the initial interference measurement result acquired by the terminal is interference from a base station other than a set of the coordination base stations. The interference source base stations corresponding to the interference measurement parameters configured by the network device are the coordination base stations for the terminal.

In another possible embodiment of the present disclosure, in the case that the terminal performs data transmission with another terminal based on single-cell, multiple-user Multiple-Input Multiple-Output (MIMO), the terminal may perform the interference measurement so as to acquire the interference from a base station other than a serving base station for the terminal as the initial interference measurement result. The other terminal is located within a serving cell identical to the terminal, and may occupy time-frequency resources identical to the terminal. The interference source base station corresponding to the interference measurement parameter configured by the network device is the serving base station for the terminal.

Upon the acquisition of the initial interference measurement result, the terminal may measure a channel matrix from the interference source base station corresponding to each interference measurement CSI-RS to the terminal.

To be specific, the terminal may measure interference channels from the interference source base station to the terminal based on the interference measurement CSI-RS. Optionally, in the case that a plurality of groups of interference measurement parameters has been configured for the terminal, the terminal may measure the interference channels from the interference source base station to the terminal based on each interference measurement CSI-RS in each set of interference measurement parameters, and further perform channel estimation, so as to acquire the channel matrix from the terminal to the interference source base station.

As mentioned above, in the embodiments of the present disclosure, the terminal may perform the interference measurement so as to acquire the initial interference measurement result, determine the CSI based on the initial interference measurement result and the interference measurement parameter configured by the network device, and report the determined CSI to the network device.

The interference measurement parameter is configured by the network device, so it may be used to reflect an actual situation of the interference information, and the interference information acquired by the terminal based on the interference measurement parameter may match the interference information during the actual transmission in a better manner. Upon the acquisition of the initial interference measurement result, the terminal may determine the CSI based on the initial interference measurement result and the interference information configured by the network device, and then report the determined CSI to the network device. As a result, it is able to increase a matching degree between the interference information measured by the terminal and the interference information during the actual transmission, thereby to enable the network device to select a more appropriate parameter for the link adaptation.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, Compact Disc-Read Only Memory (CD-ROM) and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments based on the basic concept of the present disclosure. So, the attached claims are intended to include the preferred embodiments and all of the modifications and alterations that fall within the scope of the present disclosure.

The above are merely the preferred embodiments of the present disclosure. Obviously, a person skilled in the art may make further modifications and improvements without departing from the spirit of the present disclosure, and these modifications and improvements shall also fall within the scope of the present disclosure.

What is claimed is:

1. A Channel State Information (CSI) measurement method, comprising:
   measuring interference by a terminal, to acquire initial interference;
   determining CSI by the terminal, based on the initial interference and interference measurement parameters configured by a network device; and
   reporting, by the terminal, the CSI to the network device;
   wherein the interference measurement parameters are grouped into one or more groups, and each group of the interference measurement parameters comprises one or more interference measurement CSI-Reference Signals (CSI-RSs) and one or more interference signal characteristic parameters corresponding to each interference measurement CSI-RS, wherein
   the one or more interference signal characteristic parameters represent a spatial characteristic and/or a strength of a signal from an interference source base station.

2. The CSI measurement method according to claim 1, wherein the determining the CSI by the terminal, based on the initial interference and the interference measurement parameters configured by the network device comprises: determining the CSI by the terminal, based on the initial interference, the one or more interference measurement CSI-RSs configured by the network device and the one or more interference signal characteristic parameters corresponding to the interference measurement CSI-RSs configured by the network device.

3. The CSI measurement method according to claim 1, wherein
   the one or more interference signal characteristic parameters comprise a correlation matrix of a signal from an interference source base station, or a set of pre-coding matrices used by an interference source base station for data transmission.

4. The CSI measurement method according to claim 3, further comprising, prior to determining the CSI, receiving indication information from the network device, wherein the indication information is used to indicate one or more of: one or more groups of the interference measurement parameters to be used by the terminal, one or more interference measurement CSI-RSs in each group of the interference measurement parameters to be used by the terminal, and one or more interference signal characteristic parameters corresponding to each interference measurement CSI-RS to be used by the terminal.

5. The CSI measurement method according to claim 3, wherein the determining the CSI by the terminal, based on the initial interference and the interference measurement parameters configured by the network device comprises: measuring, by the terminal, a channel matrix from an interference source base station corresponding to the one or more interference measurement CSI-RSs to the terminal, based on the one or more interference measurement CSI-RSs; and determining the CSI, by the terminal, based on the initial interference, the channel matrix and the one or more interference signal characteristic parameters corresponding to each interference measurement CSI-RS.

6. The CSI measurement method according to claim 5, wherein the determining the CSI, by the terminal, based on the initial interference, the channel matrix and the one or more interference signal characteristic parameters corresponding to each interference measurement CSI-RS comprises: determining total interference, by the terminal, based on the initial interference, the channel matrix and the one or more interference signal characteristic parameters corresponding to each interference measurement CSI-RS; and determining the CSI, by the terminal, based on the total interference.

7. The CSI measurement method according to claim 6, wherein the total interference is a sum of the initial interference and interference acquired based on the channel matrix and the one or more interference signal characteristic parameters corresponding to each interference measurement CSI-RS;
   the terminal determines the total interference based on the initial interference, the channel matrix and the one or more interference signal characteristic parameters corresponding to each interference measurement CSI-RS using the following formula:

$$Z = Z_0 + \sum_{n=1}^{N} \sum_{m=1}^{M_n} \sum_{k=1}^{K_{n,m}} G_{n,m} X_{n,m,k} G_{n,m}^H,$$

where Z represents the total interference, $Z_0$ represents the initial interference, n represents a group number of the interference measurement parameters and has a value within a range of [1, N], N represents a total number of the groups of the interference measurement parameters, m represents an index number of the one or more interference measurement CSI-RSs and has a value within a range of [1, $M_n$], $M_n$ represents a total number of the interference measurement CSI-RSs in an $n^{th}$ group of the interference measurement parameters, k represents an index number of the interference signal characteristic parameters corresponding to each interference measurement CSI-RS and has a value within a range of [1, $K_{n,m}$], $K_{n,m}$ represents a total number of the interference signal characteristic parameters corresponding to an $m^{th}$ interference measurement CSI-RS in the $n^{th}$ group of the interference measurement parameters, $G_{n,m}$ represents the channel matrix from the interference source base station to the terminal measured based on the $m^{th}$ interference measurement CSI-RS in the $n^{th}$ group of the interference measurement parameters, $X_{n,m,k}$ represents a $k^{th}$ interference signal characteristic parameter corresponding to the $m^{th}$ interference measurement CSI-RS in the $n^{th}$ group of the interference measurement parameters, and $G_{n,m}^H$ represents a conjugate transposed matrix of $G_{n,m}$;

in the case that the one or more interference signal characteristic parameters comprise a correlation matrix of the signal from the interference source base station, the terminal determines the total interference based on the initial interference, the channel matrix and the one or more interference signal characteristic parameters corresponding to each interference measurement CSI-RS using the following formula:

$$Z = Z_0 + \sum_{n=1}^{N}\sum_{m=1}^{M_n}\sum_{k=1}^{K_{n,m}} G_{n,m} R_{n,m,k} G_{n,m}^H,$$

where Z represents the total interference, $Z_0$ represents the initial interference, n represents a group number of the interference measurement parameters and has a value within a range of [1, N], N represents a total number of the groups of the interference measurement parameters, m represents an index number of the one or more interference measurement CSI-RSs and has a value within a range of [1, $M_n$], $M_n$ represents a total number of the interference measurement CSI-RSs in an $n^{th}$ group of the interference measurement parameters, k represents an index number of the interference signal characteristic parameters and has a value within a range of [1, $K_{n,m}$], $K_{n,m}$ represents a total number of the interference signal characteristic parameters corresponding to an $m^{th}$ interference measurement CSI-RS in the $n^{th}$ group of the interference measurement parameters, $G_{n,m}$ represents the channel matrix from the interference source base station to the terminal measured based on the $m^{th}$ interference measurement CSI-RS in the $n^{th}$ group of the interference measurement parameters, $R_{n,m,k}$ represents a correlation matrix of a $k^{th}$ signal from the interference source base station corresponding to the $m^{th}$ interference measurement CSI-RS in the $n^{th}$ group of the interference measurement parameters, and $G_{n,m}^H$ represents a conjugate transposed matrix of $G_{n,m}$;

in the case that the one or more interference signal characteristic parameters comprise a set of pre-coding matrices used by the interference source base station for data transmission, the terminal determines the total interference based on the initial interference, the channel matrix and the one or more interference signal characteristic parameters corresponding to each interference measurement CSI-RS using the following formula:

$$Z = Z_0 + \sum_{n=1}^{N}\sum_{m=1}^{M_n}\sum_{k=1}^{K_{n,m}} G_{n,m}\left(\sum_{p=1}^{P} W_{n,m,k,p} W_{n,m,k,p}^H\right) G_{n,m}^H,$$

where Z represents the total interference, $Z_0$ represents the initial interference, n represents a group number of the interference measurement parameters and has a value within a range of [1, N], N represents a total number of the groups of the interference measurement parameters, m represents an index number of the one or more interference measurement CSI-RSs and has a value within a range of [1, $M_n$], $M_n$ represents a total number of the interference measurement CSI-RSs in an $n^{th}$ group of the interference measurement parameters, k represents an index number of the interference signal characteristic parameters and has a value within a range of [1, $K_{n,m}$], $K_{n,m}$ represents a total number of the interference signal characteristic parameters corresponding to an $m^{th}$ interference measurement CSI-RS in the $n^{th}$ group of the interference measurement parameters, $G_{n,m}$ represents the channel matrix from the interference source base station to the terminal measured based on the $m^{th}$ interference measurement CSI-RS in the $n^{th}$ group of the interference measurement parameters, p represents an index number of the pre-coding matrices used by the interference source base station for data transmission and has a value within a range of [1, P], P represents a total number of the pre-coding matrices used by the interference source base stations for the data transmission, $W_{n,m,k,p}$ represents a $p^{th}$ pre-coding matrix used by the interference source base station corresponding to a $k^{th}$ interference signal characteristic parameter corresponding to the $m^{th}$ interference measurement CSI-RS in the $n^{th}$ group of the interference measurement parameters for the data transmission, $W_{n,m,k,p}^H$ represents a conjugate transposed matrix of $W_{n,m,k,p}$, and $G_{n,m}^H$ represents a conjugate transposed matrix of $G_{n,m}$;

in the case that the one or more interference signal characteristic parameters comprise a set of pre-coding matrices used by the interference source base station for data transmission, the terminal determines the total interference based on the initial interference, the channel matrix and the one or more interference signal characteristic parameters corresponding to each interference measurement CSI-RS using the following formula:

$$Z = Z_0 + \sum_{n=1}^{N}\sum_{m=1}^{M_n}\sum_{k=1}^{K_{n,m}} G_{n,m}\left(\sum_{p=1}^{P} \alpha_{n,m,k,p} W_{n,m,k,p} W_{n,m,k,p}^H\right) G_{n,m}^H,$$

where Z represents the total interference, $Z_0$ represents the initial interference, n represents a group number of the interference measurement parameters and has a value within a range of [1, N], N represents a total number of the groups of the interference measurement parameters, m represents an index number of the interference measurement CSI-RS and has a value within a range of [1, $M_n$], $M_n$ represents a total number of the interference measurement CSI-RSs in an $n^{th}$ group of the interference measurement parameters, k represents an index number of the interference signal characteristic parameters and has a value within a range of [1, $K_{n,m}$], $K_{n,m}$ represents a total number of the interference signal characteristic parameters corresponding to an $m^{th}$ interference measurement CSI-RS in the $n^{th}$ group of the interference measurement parameters, $G_{n,m}$ represents the channel matrix from the interference source base station to the terminal measured based on the $m^{th}$ interference measurement CSI-RS in the $n^{th}$ group of the interference measurement parameters, p represents an index number of a set of the pre-coding matrices used by the interference source base station for data transmission and has a value within a range of [1, P], P represents a total number of the pre-coding matrices in the set the pre-coding matrices used by the interference source base stations for the data transmission, $\alpha_{n,m,k,p}$ represents a weighting factor of a $p^{th}$ pre-coding matrix used by the interference source base station corresponding to a $k^{th}$ interference signal characteristic parameter corresponding to the $m^{th}$ interference measurement CSI-RS in the $n^{th}$ group of the interference measurement parameters for the data transmission, $W_{n,m,k,p}$ represents the $p^{th}$ pre-coding matrix used by the interference source base station corresponding to the $k^{th}$ interference signal characteristic parameter corresponding to the $m^{th}$ interference measurement CSI-RS in the $n^{th}$ group of the interference measurement parameters for the data transmission, $W_{n,m,k,p}^H$ represents a conjugate transposed matrix of $W_{n,m,k,p}$, and $G_{n,m}^H$ represents a conjugate transposed matrix of $G_{n,m}$.

8. The CSI measurement method according to claim 1, wherein the one or more interference signal characteristic parameters comprise a correlation matrix of a signal from an interference source base station, or a set of pre-coding matrices used by an interference source base station for data transmission.

9. The CSI measurement method according to claim 1, wherein each group of interference measurement parameters corresponds to one interference source base station.

10. A Channel State Information (CSI) acquisition method, comprising:
   transmitting, by a network device, configuration information to a terminal, the configuration information comprising interference measurement parameters; and
   receiving, by the network device, CSI reported by the terminal, the CSI being determined by the terminal based on initial interference measured by the terminal and the interference measurement parameter configured by the network device;
   wherein the interference measurement parameters are grouped into one or more groups, and each group of the interference measurement parameters comprises one or more interference measurement CSI-Reference Signals (CSI-RSs) and one or more interference signal characteristic parameters corresponding to each interference measurement CSI-RS, wherein
   the one or more interference signal characteristic parameters represent a spatial characteristic and/or a strength of a signal from an interference source base station.

11. The CSI acquisition method according to claim 10, wherein the transmitting, by the network device, the configuration information to the terminal comprises transmitting, by the network device, the configuration information to the terminal, the configuration information comprising the one or more interference measurement CSI-RSs and the one or more interference signal characteristic parameters corresponding to the interference measurement CSI-RSs configured by the network device; and
   the receiving, by the network device, the CSI reported by the terminal comprises receiving, by the network device, the CSI reported by the terminal, the CSI being determined by the terminal based on the initial interference measured by the terminal, the interference measurement CSI-RS configured by the network device, and the interference signal characteristic parameter corresponding to the interference measurement CSI-RS configured by the network device.

12. The CSI acquisition method according to claim 10, wherein prior to the receiving, by the network device, the CSI reported by the terminal, the CSI acquisition method further comprises configuring, by the network device, an interference measurement resource (IMR) for the terminal, wherein the terminal performs interference measurement on the IMR to acquire the initial interference.

13. The CSI acquisition method according to claim 10, wherein
   the one or more interference signal characteristic parameters comprise a correlation matrix of a signal from an interference source base station, or a set of pre-coding matrices used by an interference source base station for data transmission.

14. The CSI acquisition method according to claim 13, wherein prior to the receiving, by the network device, the CSI reported by the terminal, the CSI acquisition method further comprises transmitting, by the network device, indication information to the terminal, and the indication information is used to indicate one or more of: one or more groups of the interference measurement parameters to be used by the terminal, one or more interference measurement CSI-RSs in each group of the interference measurement parameters to be used by the terminal, and one or more interference signal characteristic parameters corresponding to each interference measurement CSI-RS to be used by the terminal.

15. A terminal, comprising:
   a processor;
   a memory connected to the processor via a bus interface and configured to store therein programs and data for the operation of the processor; and
   a transceiver configured to communicate with any other device over a transmission medium,
   wherein the processor is configured to call and execute the programs and data stored in the memory, so as to:
   measure interference to acquire initial interference;
   determine Channel State Information (CSI) based on the initial interference and interference measurement parameters configured by a network device; and
   report the CSI to the network device;
   wherein the interference measurement parameters are grouped into one or more groups, and each group of the interference measurement parameters comprises one or more interference measurement CSI-Reference Signals (CSI-RSs) and one or more interference signal characteristic parameters corresponding to each interference measurement CSI-RS, wherein
   the one or more interference signal characteristic parameters represent a spatial characteristic and/or a strength of a signal from an interference source base station.

16. The terminal according to claim 15, wherein the processor is configured to call and execute the programs and data stored in the memory, so as to determine the CSI based on the initial interference, the one or more interference measurement CSI-RSs configured by the network device and the one or more interference signal characteristic parameters corresponding to the interference measurement CSI-RSs configured by the network device.

17. The terminal according to claim 16, wherein each group of the interference measurement parameters comprises one or more interference measurement CSI-RSs and one or more interference signal characteristic parameters corresponding to each interference measurement CSI-RS, the processor is configured to call and execute the programs and data stored in the memory, so as to:

measure, based on the one or more interference measurement CSI-RSs, a channel matrix from an interference source base station corresponding to the one or more interference measurement CSI-RSs to the terminal, determine total interference based on the initial interference, the channel matrix and the one or more interference signal characteristic parameters corresponding to each interference measurement CSI-RS, and determine the CSI based on the total interference;

the total interference is a sum of the initial interference and interference acquired based on the channel matrix and the one or more interference signal characteristic parameters corresponding to each interference measurement CSI-RS;

the processor determines the total interference based on the initial interference, the channel matrix and the one or more interference signal characteristic parameters corresponding to each interference measurement CSI-RS using the following formula:

$$Z = Z_0 + \sum_{n=1}^{N} \sum_{m=1}^{M_n} \sum_{k=1}^{K_{n,m}} G_{n,m} X_{n,m,k} G_{n,m}^H,$$

where Z represents the total interference, $Z_0$ represents the initial interference, n represents a group number of the interference measurement parameters and has a value within a range of [1, N], N represents a total number of the groups of the interference measurement parameters, m represents an index number of the one or more interference measurement CSI-RSs and has a value within a range of [1, $M_n$], $M_n$ represents a total number of the interference measurement CSI-RSs in an $n^{th}$ group of the interference measurement parameters, k represents an index number of the interference signal characteristic parameters corresponding to each interference measurement CSI-RS and has a value within a range of [1, $K_{n,m}$], $K_{n,m}$ represents a total number of the interference signal characteristic parameters corresponding to an $m^{th}$ interference measurement CSI-RS in the $n^{th}$ group of the interference measurement parameters, $G_{n,m}$ represents the channel matrix from the interference source base station to the terminal measured based on the $m^{th}$ interference measurement CSI-RS in the $n^{th}$ group of the interference measurement parameters, $X_{n,m,k}$ represents a $k^{th}$ interference signal characteristic parameter corresponding to the $m^{th}$ interference measurement CSI-RS in the $n^{th}$ group of the interference measurement parameters, and $G_{n,m}^H$ represents a conjugate transposed matrix of $G_{n,m}$;

in the case that the one or more interference signal characteristic parameters comprise a correlation matrix of the signal from the interference source base station, the processor determines the total interference based on the initial interference, the channel matrix and the one or more interference signal characteristic parameters corresponding to each interference measurement CSI-RS using the following formula:

$$Z = Z_0 + \sum_{n=1}^{N} \sum_{m=1}^{M_n} \sum_{k=1}^{K_{n,m}} G_{n,m} R_{n,m,k} G_{n,m}^H,$$

where Z represents the total interference, $Z_0$ represents the initial interference, n represents a group number of the interference measurement parameters and has a value within a range of [1, N], N represents a total number of the groups of the interference measurement parameters, m represents an index number of the one or more interference measurement CSI-RSs and has a value within a range of [1, $M_n$], $M_n$ represents a total number of the interference measurement CSI-RSs in an $n^{th}$ group of the interference measurement parameters, k represents an index number of the interference signal characteristic parameters and has a value within a range of [1, $K_{n,m}$], $K_{n,m}$ represents a total number of the interference signal characteristic parameters corresponding to an $m^{th}$ interference measurement CSI-RS in the $n^{th}$ group of the interference measurement parameters, $G_{n,m}$ represents the channel matrix from the interference source base station to the terminal measured based on the $m^{th}$ interference measurement CSI-RS in the $n^{th}$ group of the interference measurement parameters, $R_{n,m,k}$ represents a correlation matrix of a $k^{th}$ signal from the interference source base station corresponding to the $m^{th}$ interference measurement CSI-RS in the $n^{th}$ group of the interference measurement parameters, and $G_{n,m}^H$ represents a conjugate transposed matrix of $G_{n,m}$;

in the case that the one or more interference signal characteristic parameters comprise a set of pre-coding matrices used by the interference source base station for data transmission, the processor determines the total interference based on the initial interference, the channel matrix and the one or more interference signal characteristic parameters corresponding to each interference measurement CSI-RS using the following formula:

$$Z = Z_0 + \sum_{n=1}^{N} \sum_{m=1}^{M_n} \sum_{k=1}^{K_{n,m}} G_{n,m} \left( \sum_{p=1}^{P} W_{n,m,k,p} W_{n,m,k,p}^H \right) G_{n,m}^H,$$

where Z represents the total interference, $Z_0$ represents the initial interference, n represents a group number of the interference measurement parameters and has a value within a range of [1, N], N represents a total number of the groups of the interference measurement parameters, m represents an index number of the one or more interference measurement CSI-RSs and has a value within a range of [1, $M_n$], $M_n$ represents a total number of the interference measurement CSI-RSs in an $n^{th}$ group of the interference measurement parameters, k represents an index number of the interference signal characteristic parameters and has a value within a range of [1, $K_{n,m}$], $K_{n,m}$ represents a total number of the interference signal characteristic parameters corresponding to an $m^{th}$ interference measurement CSI-RS in the $n^{th}$ group of the interference measurement parameters, $G_{n,m}$ represents the channel matrix from the interference source base station to the terminal measured based on the $m^{th}$ interference measurement CSI-RS in the $n^{th}$ group of the interference measurement parameters, p represents an index number of the pre-coding matrices used by the interference source base station for data transmission and has a value within a range of [1, P], P represents a total number of the pre-coding matrices used by the interference source base stations for the data transmission, $W_{n,m,k,p}$ represents a $p^{th}$ pre-coding matrix used by the interference source base station corresponding to a $k^{th}$ interference signal characteristic parameter corresponding to the $m^{th}$ interference measurement CSI-RS in the $n^{th}$ group of the interference measurement parameters for the data transmission, $W_{n,m,k,p}^{H}$ represents a conjugate transposed matrix of $W_{n,m,k,p}$, and $G_{n,m}^{H}$ represents a conjugate transposed matrix of $G_{n,m}$;

in the case that the one or more interference signal characteristic parameters comprise a set of pre-coding matrices used by the interference source base station for data transmission, the processor determines the total interference based on the initial interference, the channel matrix and the one or more interference signal characteristic parameters corresponding to each interference measurement CSI-RS using the following formula:

$$Z = Z_0 + \sum_{n=1}^{N}\sum_{m=1}^{M_n}\sum_{k=1}^{K_{n,m}} G_{n,m}\left(\sum_{p=1}^{P} \alpha_{n,m,k,p} W_{n,m,k,p} W_{n,m,k,p}^{H}\right) G_{n,m}^{H},$$

where Z represents the total interference, $Z_0$ represents the initial interference, n represents a group number of the interference measurement parameters and has a value within a range of [1, N], N represents a total number of the groups of the interference measurement parameters, m represents an index number of the interference measurement CSI-RS and has a value within a range of [1, $M_n$], $M_n$ represents a total number of the interference measurement CSI-RSs in an $n^{th}$ group of the interference measurement parameters, k represents an index number of the interference signal characteristic and has a value within a range of [1, $K_{n,m}$], $K_{n,m}$ represents a total number of the interference signal characteristic parameters corresponding to an $m^{th}$ interference measurement CSI-RS in the $n^{th}$ group of the interference measurement parameters, $G_{n,m}$ represents the channel matrix from the interference source base station to the terminal measured based on the $m^{th}$ interference measurement CSI-RS in the $n^{th}$ group of the interference measurement parameters, p represents an index number of a set of the pre-coding matrices used by the interference source base station for data transmission and has a value within a range of [1, P], P represents a total number of the pre-coding matrices in the set the pre-coding matrices used by the interference source base stations for the data transmission, $\alpha_{n,m,k,p}$ represents a weighting factor of a $p^{th}$ pre-coding matrix used by the interference source base station corresponding to a $k^{th}$ interference signal characteristic parameter corresponding to the $m^{th}$ interference measurement CSI-RS in the $n^{th}$ group of the interference measurement parameters for the data transmission, $W_{n,m,k,p}$ represents the $p^{th}$ pre-coding matrix used by the interference source base station corresponding to the $k^{th}$ interference signal characteristic parameter corresponding to the $m^{th}$ interference measurement CSI-RS in the $n^{th}$ group of the interference measurement parameters for the data transmission, $W_{n,m,k,p}^{H}$ represents a conjugate transposed matrix of $W_{n,m,k,p}$ and $G_{n,m}^{H}$ represents a conjugate transposed matrix of $G_{n,m}$.

\* \* \* \* \*